(12) United States Patent
McFarland et al.

(10) Patent No.: US 10,151,843 B2
(45) Date of Patent: Dec. 11, 2018

(54) SYSTEMS AND METHODS OF TRACKING POSITION AND SPEED IN GNSS APPLICATIONS

(71) Applicant: Radio Systems Corporation, Knoxville, TN (US)

(72) Inventors: Scott McFarland, Knoxville, TN (US); Keith Griffith, Oneida, TN (US); Rick Seltzer, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 331 days.

(21) Appl. No.: 14/985,793

(22) Filed: Dec. 31, 2015

(65) Prior Publication Data

US 2016/0116602 A1    Apr. 28, 2016

Related U.S. Application Data

(63) Continuation of application No. 13/302,447, filed on Nov. 22, 2011, now abandoned.

(51) Int. Cl.

| | |
|---|---|
| *G01S 19/40* | (2010.01) |
| *G01S 19/45* | (2010.01) |
| *G01S 19/52* | (2010.01) |
| *H04W 4/02* | (2018.01) |
| *G01C 21/16* | (2006.01) |
| *G01S 19/39* | (2010.01) |

(52) U.S. Cl.
CPC ............. *G01S 19/45* (2013.01); *G01S 19/40* (2013.01); *G01S 19/52* (2013.01); *H04W 4/025* (2013.01); *G01C 21/165* (2013.01); *G01S 19/39* (2013.01); *H04W 4/027* (2013.01)

(58) Field of Classification Search
CPC .......... G01S 19/45; G01S 19/39; G01S 19/40; G01S 19/52; G01S 19/42; G01S 19/51; G01S 19/48; G01S 19/47; G01S 19/49; H04W 4/025; H04W 4/027; H04W 4/028; G01C 21/16; G01C 21/165
USPC ............ 342/357.23, 357.22, 357.35, 357.28, 342/357.3, 357.31, 357.32, 357.34; 701/472; 340/539.13
See application file for complete search history.

(56) References Cited

U.S. PATENT DOCUMENTS

| | | | |
|---|---|---|---|
| 5,483,456 A | 1/1996 | Kuwahara et al. | |
| 5,491,486 A * | 2/1996 | Welles, II | G01S 1/04 342/357.74 |

(Continued)

OTHER PUBLICATIONS

European Patent Office; Supp'l European Search Report; dated Jul. 7, 2016; EPO Form 1507S.

(Continued)

*Primary Examiner* — Chuong P Nguyen
(74) *Attorney, Agent, or Firm* — Pitts & Lake, P.C.

(57) ABSTRACT

Systems and methods of tracking a mobile subject based on Global Navigation Satellite Systems (GNSS) data, including a boundary test unit to evaluate a boundary violation according to the current actionable position and current actionable speed of the mobile subject relative to a predetermined boundary, wherein the current actionable position is a sum of a prior actionable position and a product of a degraded position difference and a position tracking coefficient, and a current actionable speed is a function of a prior actionable speed and a degraded speed estimate.

24 Claims, 27 Drawing Sheets

(56) References Cited

U.S. PATENT DOCUMENTS

| | | |
|---|---|---|
| 5,538,119 A | 10/1996 | Schipper et al. |
| 5,590,043 A | 12/1996 | McBurney |
| 5,760,737 A | 6/1998 | Brenner |
| 5,791,294 A | 8/1998 | Manning |
| 5,868,100 A | 2/1999 | Marsh |
| 5,949,350 A | 9/1999 | Girard et al. |
| 5,963,130 A | 10/1999 | Schlager et al. |
| 6,043,748 A | 3/2000 | Touchton et al. |
| 6,232,880 B1 | 5/2001 | Anderson et al. |
| 6,232,916 B1 | 5/2001 | Grillo et al. |
| 6,263,836 B1 | 7/2001 | Hollis |
| 6,271,757 B1 | 8/2001 | Touchton et al. |
| 6,313,786 B1 | 11/2001 | Sheynblat et al. |
| 6,453,238 B1* | 9/2002 | Brodie .................. G01C 21/165 340/988 |
| 6,487,992 B1 | 12/2002 | Hollis |
| 6,581,546 B1* | 6/2003 | Dalland ................ A01K 15/023 119/712 |
| 6,700,492 B2 | 3/2004 | Touchton et al. |
| 6,707,422 B2 | 3/2004 | Sheynblat et al. |
| 6,826,478 B2* | 11/2004 | Riewe ..................... G01S 19/47 340/988 |
| 6,903,682 B1 | 6/2005 | Maddox |
| 6,944,541 B2 | 9/2005 | Pasturel et al. |
| 7,034,695 B2 | 4/2006 | Troxler |
| 7,043,257 B2 | 5/2006 | Nohara |
| 7,117,087 B2 | 10/2006 | Jung et al. |
| 7,136,015 B2 | 11/2006 | Wakamatsu |
| 7,170,447 B2 | 1/2007 | Riley et al. |
| 7,436,354 B2 | 10/2008 | Lee |
| 7,443,338 B2 | 10/2008 | Wakamatsu et al. |
| 7,446,706 B2 | 11/2008 | Riley et al. |
| 7,541,975 B2 | 6/2009 | Sever et al. |
| 7,577,526 B2 | 8/2009 | Kim et al. |
| 7,764,228 B2* | 7/2010 | Durst .................... G01S 5/0027 342/357.25 |
| 7,786,476 B2 | 8/2010 | Siebert |
| 7,839,327 B2 | 11/2010 | Riley et al. |
| 7,856,947 B2 | 12/2010 | Giunta |
| 7,911,988 B2 | 3/2011 | Riley et al. |
| 7,920,066 B2 | 4/2011 | Troxler |
| 8,362,949 B2* | 1/2013 | Yang ...................... G01S 19/49 342/357.31 |
| 8,560,236 B1* | 10/2013 | Zahir ..................... G01C 21/20 701/533 |
| 8,566,033 B2* | 10/2013 | Clemenceau ........... G01S 19/48 701/469 |
| 8,954,095 B2* | 2/2015 | Watanabe ............. A61B 5/0002 455/456.1 |
| 8,957,812 B1* | 2/2015 | Hill ........................ G01S 5/0027 342/445 |
| 2001/0037179 A1 | 11/2001 | Vock et al. |
| 2003/0146871 A1 | 8/2003 | Karr et al. |
| 2006/0061469 A1* | 3/2006 | Jaeger ..................... B60R 25/00 340/539.13 |
| 2008/0036610 A1* | 2/2008 | Hokuf .................. A01K 11/008 340/573.3 |
| 2009/0018772 A1 | 1/2009 | Watanabe et al. |
| 2009/0115656 A1 | 5/2009 | Raman et al. |
| 2009/0267832 A1* | 10/2009 | Hymel .................. G01S 19/252 342/357.52 |
| 2010/0070179 A1 | 3/2010 | Cameron |
| 2010/0113061 A1 | 5/2010 | Holcman |
| 2010/0318294 A1 | 12/2010 | Rosing et al. |
| 2011/0046915 A1 | 2/2011 | Hol et al. |
| 2011/0057833 A1 | 3/2011 | France et al. |
| 2011/0172916 A1* | 7/2011 | Pakzad .................. G01C 21/14 701/533 |
| 2011/0231050 A1 | 9/2011 | Goulding |
| 2017/0217433 A1* | 8/2017 | Halder .................. B60W 40/04 |

OTHER PUBLICATIONS

Technical Description, Fastrax IT03 OEM GPS Receive; rev 2.4 Jun. 30, 2006 Fastrax Ltd.
Technical Description, Fastrax IT03 OEM GPS Receive; rev 2.7 Apr. 23, 2010 Fastrax Ltd.
ISuite03SKO; Rev 3.41.8112 1197-2007, Fastrax Ltd.
Patent Cooperation Treaty (PCT); Int'l Search Report; Form PCT/ISA/210; dated Mar. 22, 2013.

\* cited by examiner

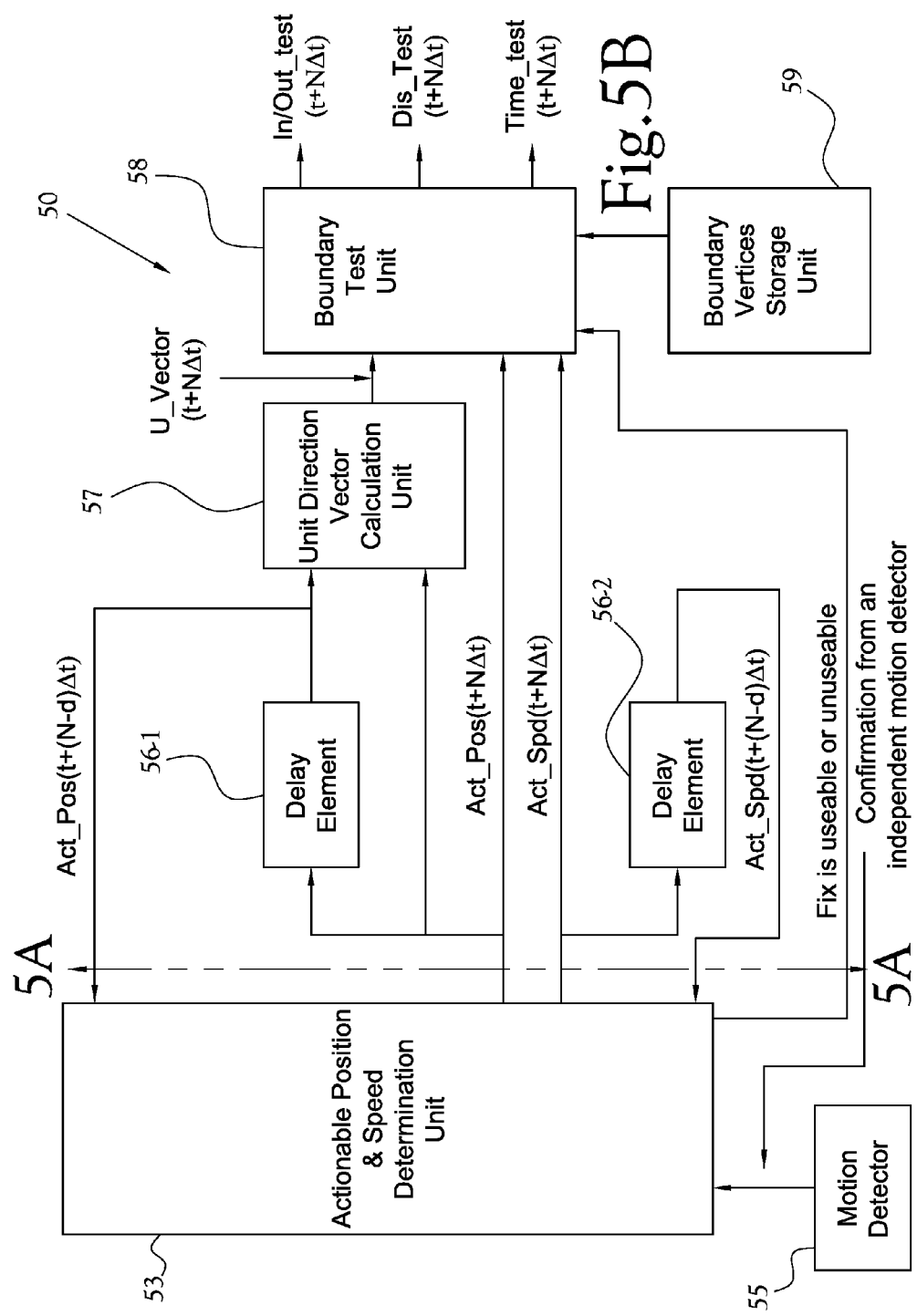

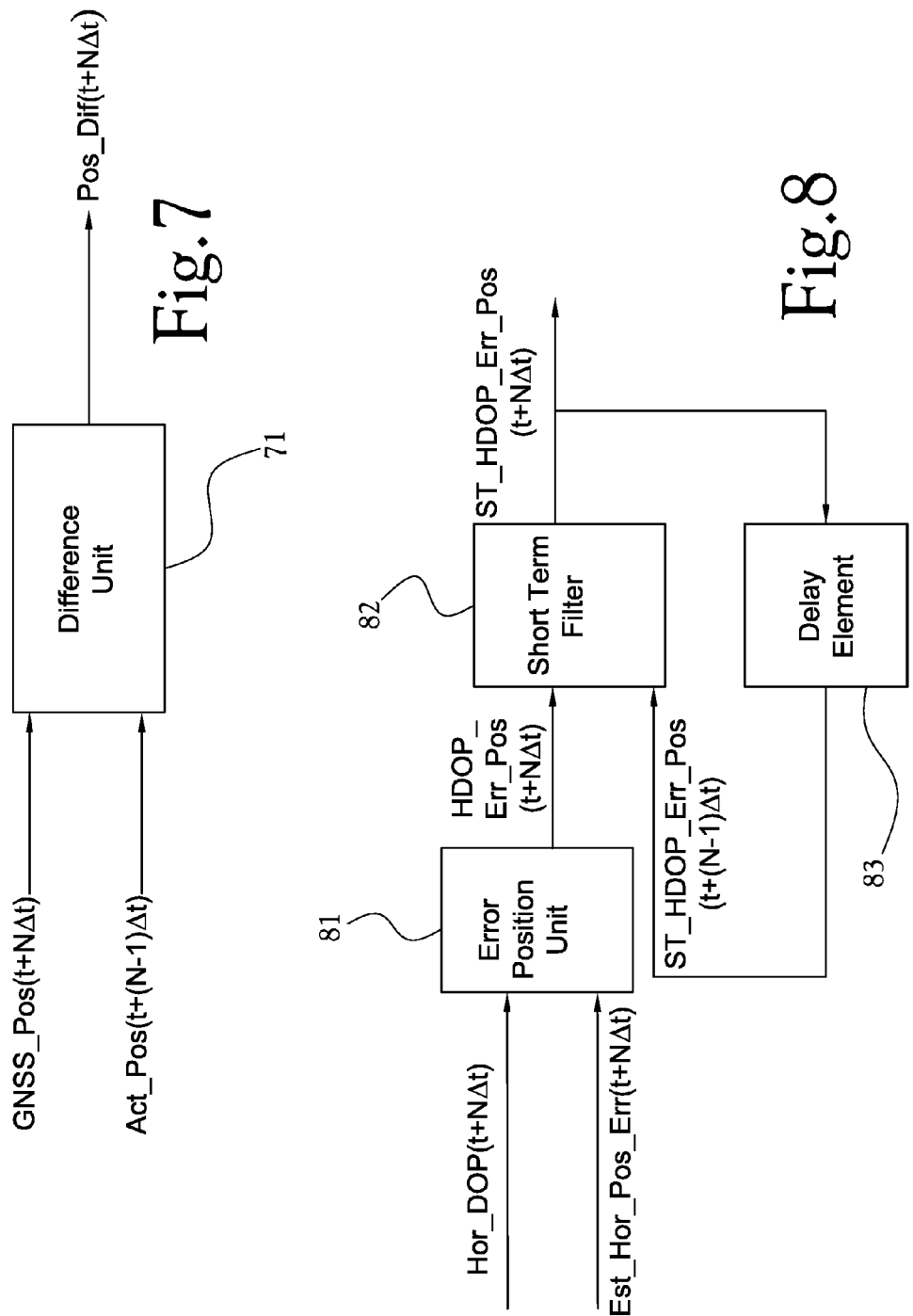

SYSTEMS AND METHODS OF TRACKING POSITION AND SPEED IN GNSS APPLICATIONS

CROSS-REFERENCE TO RELATED APPLICATIONS

This application is a continuation-in-part of U.S. patent application Ser. No. 13/302,447 filed on Nov. 22, 2011.

FIELD OF INVENTION

The present general inventive concept relates to systems and methods of tracking the position and speed of mobile subjects relative to boundaries, and, more particularly, to an apparatus and method of tracking mobile subjects relative to boundaries in Global Navigation Satellite Systems (GNSS) applications.

BACKGROUND

It is often desirable to monitor a mobile subject so that the mobile subject may be contained within a selected boundary, and to identify when the mobile subject has left such a boundary. A conventional method of monitoring the movement of a mobile subject and detecting whether the mobile subject has left a selected boundary, or containment area, is the employment of a GNSS fencing system.

Various conventional GNSS fencing systems, which employ GNSS systems such as the Global Positioning System (GPS) of the United States, the Russian GLONASS, etc., have been typically used to define the boundaries of a selected containment area and monitor the movement of a mobile subject relative to the selected containment area. In such systems, the position and speed of the mobile subject to be confined are monitored through the use of the GNSS satellites to determine if and when the mobile subject crosses a boundary. Typically, a mobile device to be provided to the mobile subject is used to program the boundary of the selected confinement area as the device is moved along such boundary. Alternatively, the coordinates of the boundary vertices may be programmed directly into the mobile device. If the mobile subject provided with the mobile device crosses the boundary, a corrective stimulus can be provided to the mobile subject.

These conventional GNSS fencing systems typically employ differential GNSS to improve the perceived position and speed of a mobile subject. Such a practice improves the accuracy of determining the mobile subject's position when compared to a non-differential system by incorporating pseudo-range (or distance) corrections for each satellite observable in the mobile subject's position solution. These pseudo-range errors arise due to variations in the atmosphere or signal path for each satellite signal as the signal travels to a receiver provided to the mobile subject. The pseudo-range corrections are computed by a fixed GNSS receiver at a known location, and communicated to the mobile subject receiver over a suitable communication link.

Conventional GNSS position and speed determining systems perform best in fencing or boundary detection applications when favorable signal conditions exist. However, anomalies in GNSS tracking occur even under optimal conditions. Unfavorable signal conditions may exist at the location of the mobile subject that do not exist at the fixed GNSS receiver, and therefore are not recognized as such by the fixed GNSS receiver. In situations in which unfavorable signal conditions exist, errors produced while determining position and speed frequently result in a false boundary violation. Such false boundary violations may erode consumer confidence, and/or may have a negative psychological effect on mobile subjects which are provided with the mobile device to restrict the mobile subject's movement to within the containment area. For instance, if the mobile subject is a pet, such as a dog, which may receive a corrective stimulus as a result of determining that a boundary has been violated, receiving the corrective stimulus while not actually violating the containment boundary may disrupt the training process.

As such, there exists a desire for a mobile position determining apparatus that can recognize, quantify, and mitigate position and speed errors, especially under unfavorable GNSS signal conditions, for the purpose of reducing the probability of false violation determinations.

BRIEF SUMMARY

Embodiments of the present general inventive concept provide systems and methods of determining an actionable position and speed of a mobile subject based on GNSS data.

Example embodiments of the present general inventive concept can be achieved by providing an apparatus to track a mobile subject based on Global Navigation Satellite Systems (GNSS) data, including a motion detector to detect motion of the mobile subject independently of the GNSS data and an actionable position and speed determination unit to receive the GNSS data and determine an actionable position and an actionable speed of the mobile subject.

A current actionable position can be a sum of a prior actionable position and a product of a degraded position difference and a position tracking coefficient, the degraded position difference being a product of a position degrade coefficient and a difference between a current GNSS position and the prior actionable position, the position degrade coefficient being a function of most recent and prior GNSS position solution metrics and GNSS signal metrics, and the position tracking coefficient can be a function of the actionable speed and a detected motion from the motion detector.

A current actionable speed can be a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of most recent and prior GNSS speed solution metrics, and the speed degrade coefficient can be a function of the GNSS signal metrics.

A boundary test unit can be provided to evaluate a boundary violation according to the current actionable position and current actionable speed of the mobile subject relative to a predetermined boundary.

Example embodiments of the present general inventive concept can also be achieved by providing a method of tracking a mobile subject based on Global Navigation Satellite Systems (GNSS) data, including detecting motion of the mobile subject independently of the GNSS data with a motion detector and receiving the GNSS data and determining an actionable position and an actionable speed of the mobile subject. In additional embodiments, a current actionable position can be a sum of a prior actionable position and a product of a degraded position difference and a position tracking coefficient, the degraded position difference being a product of a position degrade coefficient and a difference between a current GNSS position and the prior actionable position, the position degrade coefficient being a function of most recent and prior GNSS position solution metrics and GNSS signal metrics, and the position tracking coefficient can be a function of the actionable speed and a detected motion from the motion detector.

A current actionable speed can be a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of most recent and prior GNSS speed solution metrics, and the speed degrade coefficient being a function of the GNSS signal metrics. It is possible to evaluate a boundary violation according to the current actionable position and current actionable speed of the mobile subject relative to a predetermined boundary.

Example embodiments of the present general inventive concept may be achieved by an apparatus to track a mobile subject based on Global Navigation Satellite Systems (GNSS) data, including a motion detector to detect motion of the mobile subject independently of the GNSS data, an actionable position and speed determination unit configured to receive the GNSS data and determine an actionable position and speed of the mobile subject according to GNSS position and speed, detection results of the motion detector, and at least one of, or any combination of, GNSS solution metrics, GNSS signal metrics, or a prior actionable position and speed, and a boundary test unit to evaluate the actionable position and speed of the mobile subject relative to a predetermined boundary.

The GNSS solution metrics may include an horizontal dilution of precision, estimated horizontal position error, estimated speed error, the horizontal dilution of precision times the estimated horizontal position error, the horizontal dilution of precision times the estimated speed error, or any combination thereof.

The GNSS signal metrics may include a quantity representative of the aggregate observable GNSS signal to noise ratio and/or a quantity representative of the aggregate eligible GNSS signal to noise ratio, observable indicating all GNSS signals used to determine the GNSS position and speed, and eligible indicating all decodable GNSS signals emanating from satellites above a predetermined elevation threshold.

The motion detector may be a micro electro-mechanical systems (MEMS) device.

The motion detector may be an omnidirectional vibration sensor.

A predetermined location within a containment area may be used as an initial start location of the mobile subject.

The prior actionable position and speed may be maintained in response to the motion detector detecting no motion of the mobile subject.

The GNSS data may include GNSS PVT (position, velocity, time) signals, pseudo-range error data, time assist data, ephemeris assist data, or any combination thereof.

The mobile subject may be a human or animal.

The apparatus may be attached to or worn by the mobile subject.

Example embodiments of the present general inventive concept may also be achieved by a method of tracking a mobile subject based on Global Navigation Satellite Systems (GNSS) data, the method including detecting motion of the mobile subject independently of the GNSS data with a motion detector, receiving the GNSS data and determining an actionable position and speed of the mobile subject, with an actionable position and speed unit, according to GNSS position and speed, detection results of the motion detector, and at least one of, or any combination of, GNSS solution metrics, GNSS signal metrics, or a prior actionable position and speed, and evaluating, with a boundary test unit, the actionable position and speed of the mobile subject relative to a predetermined boundary.

The GNSS solution metrics may include an horizontal dilution of precision, estimated horizontal position error, estimated speed error, the horizontal dilution of precision times the estimated horizontal position error, the horizontal dilution of precision times the estimated speed error, or any combination thereof.

The GNSS signal metrics may include a quantity representative of the aggregate observable GNSS signal to noise ratio and/or a quantity representative of the aggregate eligible GNSS signal to noise ratio, observable indicating all GNSS signals used to determine the GNSS position and speed, and eligible indicating all decodable GNSS signals emanating from satellites above a predetermined elevation threshold.

A predetermined location within a containment area may be used as an initial start location of the mobile subject.

The prior actionable position and speed may be maintained in response to detecting no motion of the mobile subject.

The GNSS data may include GNSS PVT (position, velocity, time) signals, pseudo-range error data, time assist data, ephemeris assist data, or any combination thereof.

The mobile subject may be a human or animal.

Example embodiments of the present general inventive concept may also be achieved by a computer readable storage medium having recorded thereon a program to cause a computer to perform a method of tracking a mobile subject to detect a boundary violation based on Global Navigation Satellite Systems (GNSS) data, the method including detecting motion of the mobile subject independently of the GNSS data with a motion detector, receiving the GNSS data and determining an actionable position and speed of the mobile subject, with an actionable position and speed unit, according to GNSS position and speed, detection results of the motion detector, and at least one of, or any combination of, GNSS solution metrics, GNSS signal metrics, or a prior actionable position and speed, and evaluating, with a boundary test unit, the actionable position and speed of the mobile subject relative to a predetermined boundary.

Example embodiments of the present general inventive concept can also be achieved by providing an apparatus to track a mobile subject based on Global Navigation Satellite Systems (GNSS) data, including a motion detector to detect motion of the mobile subject independently of the GNSS data, an actionable position and speed determination unit to receive the GNSS data and determine an actionable position and an actionable speed of the mobile subject, wherein a current actionable position is a sum of a prior actionable position and a product of a degraded position difference and a position tracking coefficient, the degraded position difference being a product of a position degrade coefficient and a difference between a current GNSS position and the prior actionable position, the position degrade coefficient being a function of most recent and prior GNSS position solution metrics and GNSS signal metrics, and the position tracking coefficient being a function of the actionable speed and a detected motion from the motion detector, and wherein a current actionable speed is a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of most recent and prior GNSS speed solution metrics, and the speed degrade coefficient being a function of the GNSS signal metrics, and a boundary test unit to evaluate a boundary violation according to the current actionable position and current actionable speed of the mobile subject relative to a predetermined boundary.

Example embodiments of the present general inventive concept may also be achieved by an apparatus to track a mobile subject based on Global Navigation Satellite Systems (GNSS) data, the apparatus including an actionable position and speed determination unit configured to receive GNSS data and determine an actionable position and an actionable speed of the mobile subject, wherein a current actionable position is determined by processing current GNSS position data according to one or more estimate parameters derived from one or more previous actionable positions, and a current actionable speed is determined by processing current GNSS speed data according to one or more estimate parameters derived from one or more previous actionable speeds.

The apparatus may further include a boundary test unit to evaluate a boundary violation according to the current actionable position and current actionable speed of the mobile subject relative to a predetermined boundary.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 5A-5B illustrate an actionable position and speed determining apparatus according to an embodiment of the present general inventive concept;

FIG. 7 illustrates the computation of a position difference between a current GNSS position and a prior actionable position according to an embodiment of the present general inventive concept;

FIG. 8 illustrates the computation of a short term GNSS solution metric based on HDOP and an estimated horizontal position error according to an embodiment of the present general inventive concept;

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The described progression of processing operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

Figure 1:
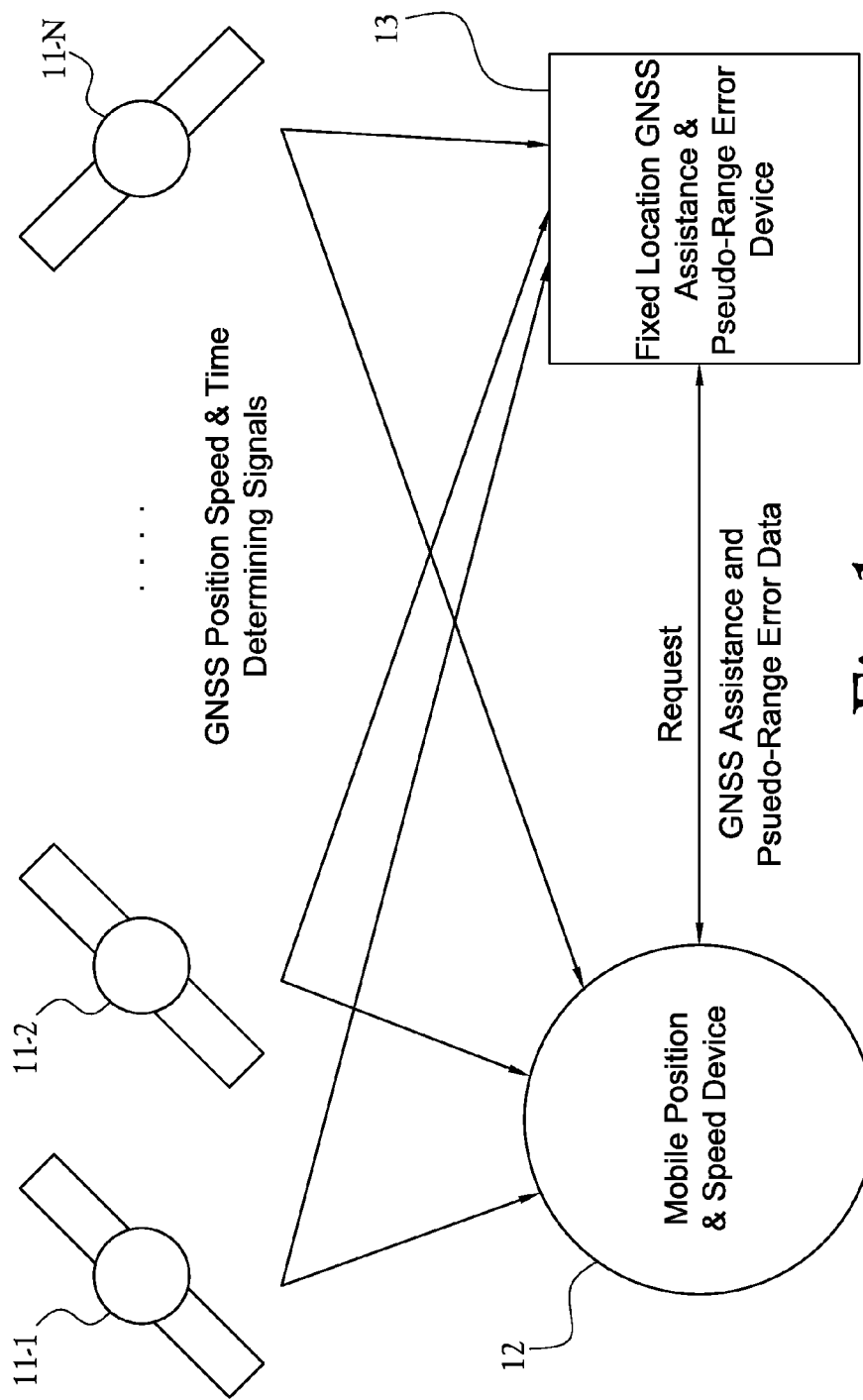
FIG. 1 illustrates a conventional differential GNSS system used to determine a mobile position and speed.

A conventional differential GNSS system is illustrated in FIG. 1. A plurality of satellites 11-1, 11-2, . . . 11-N transmit GNSS position speed and time determining signals that are received by a mobile position and speed determining device 12, which is provided to a mobile subject, and by a fixed location GNSS assistance and pseudo-range error device 13. The mobile position and speed determining device 12 also sends requests for GNSS assistance and pseudo-range error data to the fixed location GNSS assistance and pseudo-range error device 13, and said data is accordingly returned to the mobile position and speed determining device 12. Because of the immobile arrangement of the fixed location GNSS assistance and pseudo-range error device 13, anomalies existing due to the atmosphere and signal path variations, etc., may be readily recognized so that corrective data may be transmitted to and used by the mobile position and speed determining device 12.

In conventional GNSS fencing systems, the containment area is described by a collection of vertices (i.e., latitude, longitude) and the lines (straight line segments, arcs, curves, etc.) that connect consecutive vertices. As the desired operation of the system is to contain the mobile subject within close proximity to the containment area, the mobile position and speed determining device 12 is provided to the mobile subject. The device 12 is typically worn by the mobile subject, or attached to the mobile subject by a suitable means. As the mobile subject, and therefore the mobile position and speed determining device 12, moves, GNSS position and speed determinations are determined at discrete time intervals to determine the new position and speed of the mobile subject. The determined position and speed are tested against one or more metrics or conditions that constitute a boundary violation regarding the containment area. Typically, the time intervals at which the position and speed are determined range from 250 ms to 1 second.

Figure 2:
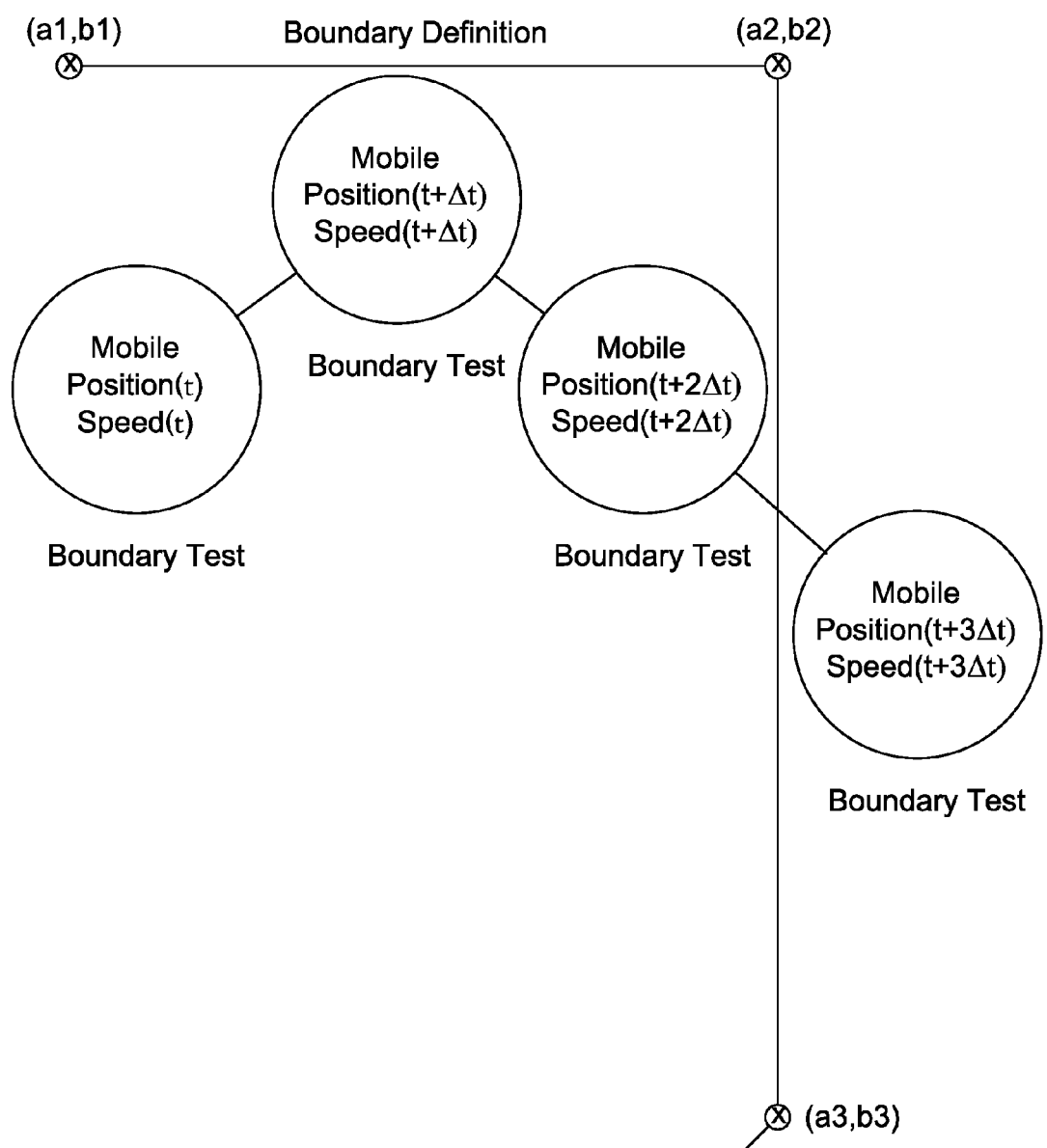
FIG. 2 illustrates the determination of the position and speed of a mobile device at discrete time intervals with a conventional differential GNSS system.

FIG. 2 illustrates the determination of the position and speed of a mobile device at discrete time intervals with a conventional differential GNSS system. A portion of a containment area is illustrated by the vertices (a1,b1), (a2,b2), and (a3,b3), as well as the lines connecting these consecutive vertices, which define the boundary of the containment area. A boundary test is conducted at an initial time (t) to determine the position and speed of the mobile device, which is provided to a mobile subject. Subsequent boundary tests are conducted at times (t+$\Delta$t), (t+2$\Delta$t), and (t+3$\Delta$t). As can be seen by the last boundary test illustrated in FIG. 2, the position of the mobile device should be determined to be outside of the containment area.

Conventional GNSS fencing systems utilize one or more tests regarding the determined position and speed of the mobile device to determine whether a boundary violation of the containment area has occurred. A typical test is simply determining whether the current position of the mobile device is within or outside of the defined containment area. Another typical test is a determination of the shortest distance to the boundary. Yet another typical test is a determination of the shortest anticipated time to reach the boundary based on a unit direction vector and speed. As illustrated in FIG. 2, the determination of the position and speed of the mobile device at (t+2$\Delta$t) will likely result in a direction vector which indicates that a boundary violation is imminent.

Figure 3:
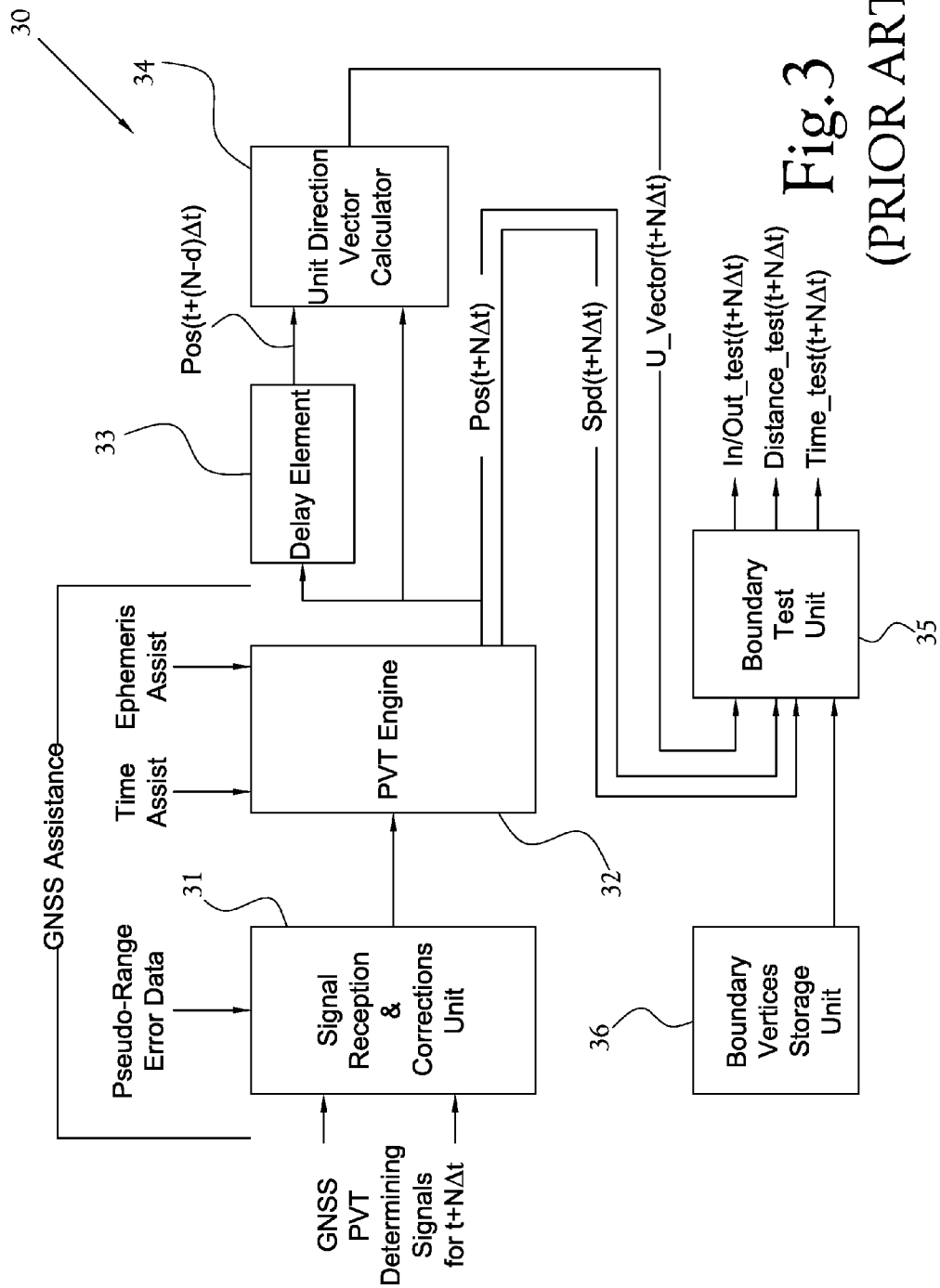
FIG. 3 illustrates a conventional mobile position and speed determining device.

FIG. 3 illustrates a conventional mobile position and speed determining device 30. A signal reception and corrections unit 31 receives GNSS PVT (position, velocity, time) determining signals for a time (t+N$\Delta$t) from a number of GNSS satellites. The signal reception and corrections unit 31 also receives GNSS assistance data in the form of pseudo-range error data from a fixed location GNSS assistance and pseudo-range error device. After correcting the received satellite signals according to the pseudo-range error data, the signal reception and corrections unit 31 transmits the resulting data to a PVT engine 32. The PVT engine 32 receives the corrected data from the signal reception and corrections unit 31, along with additional GNSS assistance data in the form of time assist and ephemeris assist data, and determines a position Pos(t+N$\Delta$t) and speed Spd(t+N$\Delta$t) for the mobile position and speed determining device 30 at the time t+N$\Delta$t. The PVT engine 32 transmits the position Pos(t+N$\Delta$t) to a delay element 33, unit direction vector calculator 34, and a boundary test unit 35. The delay element 33 introduces a delay d to the position Pos(t+N$\Delta$t) to generate and transmit a delayed position Pos(t+(N−d)$\Delta$t) to the unit direction vector calculator 34. The unit direction vector calculator 34 receives the position Pos(t+N$\Delta$t) and the delayed position Pos(t+(N−d)$\Delta$t) and determines a unit direction vector U_vector(t+N$\Delta$t), which is transmitted to the boundary test unit 35. The boundary test unit also receives the speed Spd(t+N$\Delta$t) from the PVT engine 32.

The boundary test unit 35 also receives the boundary vertices (a1,b1), (a2,b2), . . . (aN,bN) of the containment area from a boundary vertices storage unit 36. Using the received boundary vertices, speed Spd(t+N$\Delta$t), position Pos (t+N$\Delta$t), and unit direction vector U_vector(t+N$\Delta$t), the boundary test unit 35 determines whether the mobile position and speed determining device 30 is currently inside the containment area, the shortest distance from the device 30 to the boundary of the containment area, and the shortest anticipated time to reach the boundary. As illustrated in FIG. 3, the boundary test unit 35 outputs the results of these determinations as In/Out_test(t+N$\Delta$t), Distance_test(t+N$\Delta$t), and Time_test(t+N$\Delta$t). These resulting signals may be used to trigger a stimulus from the device 30.

Typically, the conventional differential GNSS fencing system functions less erratically in situations in which the mobile device receiving the GNSS signals is operating under favorable GNSS signal conditions. However, especially in situations in which common signal impairments exits, such as when the mobile device has moved inside a home or other structure, is under heavy foliage, etc., the resulting differential GNSS position and speed determinations may still contain substantial and unresolvable errors. While the conventional differential GNSS system is an improvement over a non-differential GNSS system, the conventional differential GNSS system cannot adequately correct for these commonplace signal impairments, and the result will often be false boundary violation determinations.

A conventional improvement over the typical differential GNSS fencing system is the operation of "position pinning". A position pinning algorithm will "pin", or hold constant, a GNSS position in the absence of a sufficient change in position or speed. Position pinning was developed to eliminate drift in the GNSS position determination in the event that the mobile device is stationary. When sufficient position change or speed is detected, the position pinning algorithm is bypassed.

Figure 4:
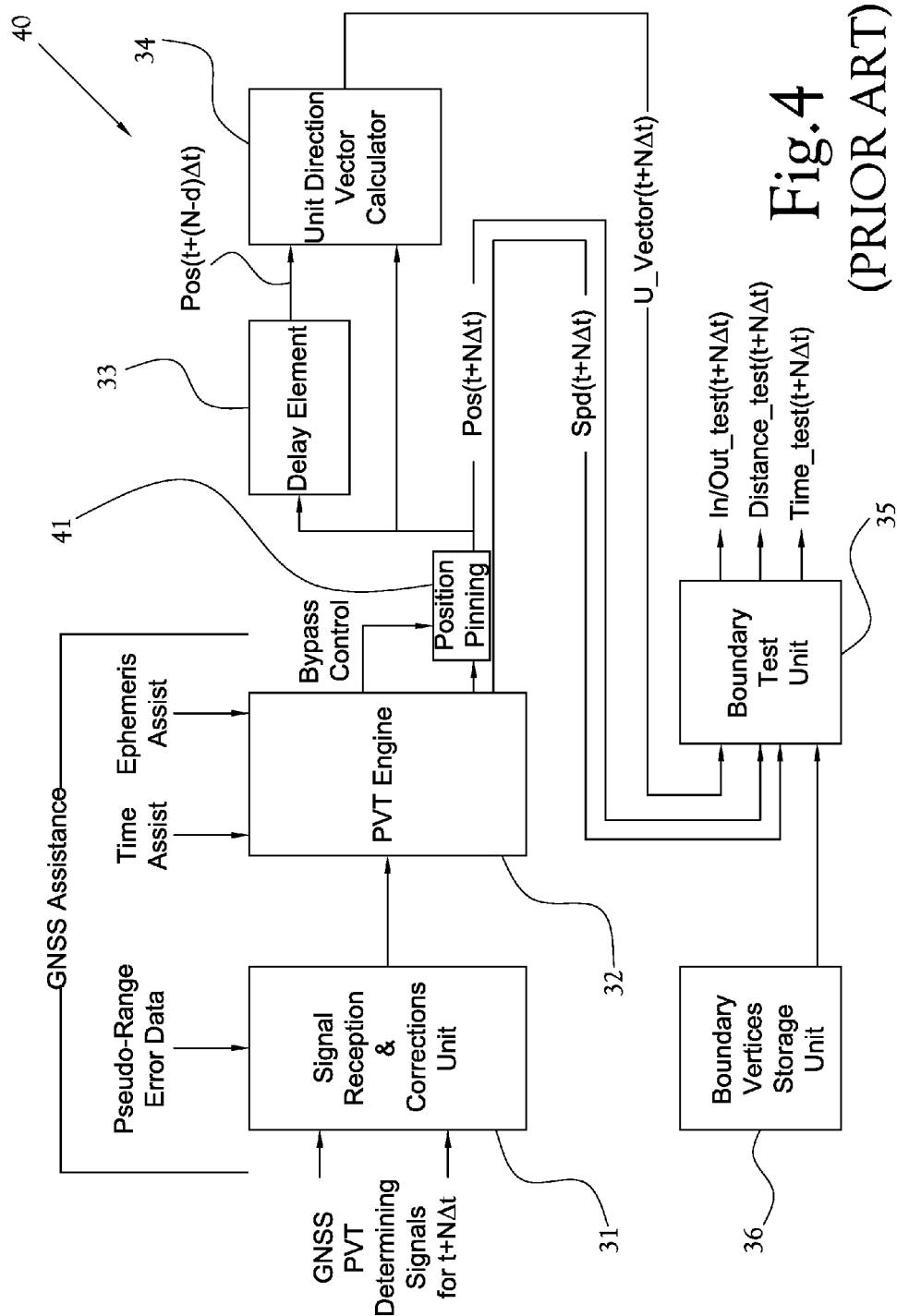
FIG. 4 illustrates a conventional mobile position and speed determining device which includes a position pinning unit.

FIG. 4 illustrates a conventional mobile position and speed determining device 40 which includes a position pinning unit 41. As illustrated in FIG. 4, the device 40 is similar to the device 30 illustrated in FIG. 3, with the addition of the position pinning unit 41. The PVT engine 32 controls the position pinning unit 41 to be bypassed in the event that sufficient position change or speed are detected.

As previously described, the addition of the position pinning unit to the mobile position and speed determining device 40 aids in maintaining a nearly constant GNSS position for the mobile device while the mobile device is not moving. Thus, some potential erratic position determinations may be avoided in situations in which the mobile device is stationary. However, this improvement does nothing to mitigate the effects of the described common GNSS signal impairments in situations in which the mobile device is moving.

Figure 5A:
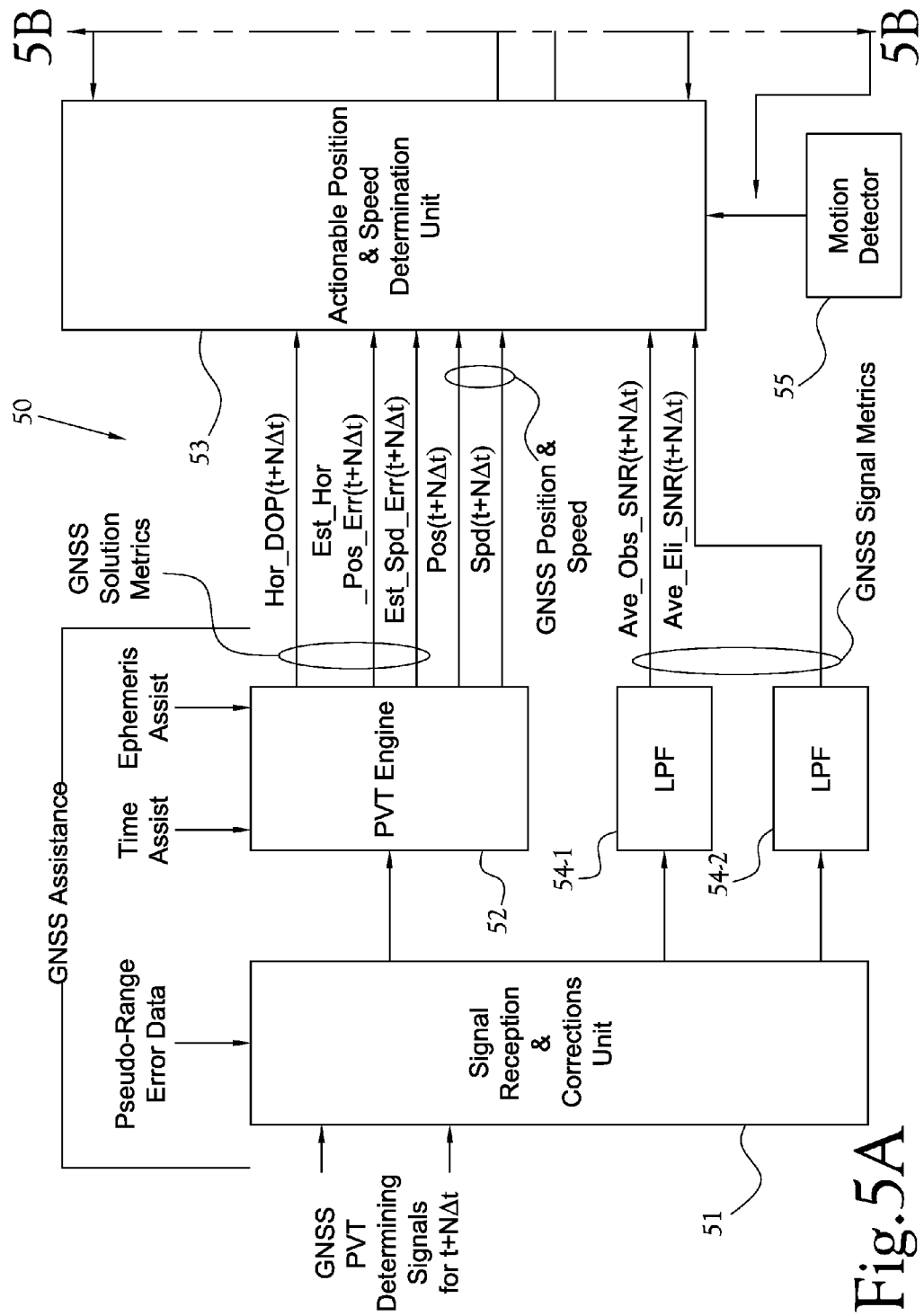

FIGS. 5A-5B illustrate an actionable GNSS position and speed determining apparatus 50 according to an embodiment of the present general inventive concept. Each of FIGS. 5A-5B illustrate portions of this example apparatus, which are separated by the illustrated cut line. The actionable position and speed determining apparatus 50 may be referred to interchangeably throughout this description as the "mobile device".

It is noted that the apparatus of FIGS. 5A-5B is merely one example embodiment of the present general inventive concept. Further, there are many different possible physical configurations by which to implement the illustrated embodiment. For example, two or more of the units may be combined in a single integrated circuit chip, two or more integrated circuit chips may be combined on one or more chipsets, and so on. Also, some or all of the described operations may be performed and/or controlled by software, and the various described units, elements, etc., may be functional blocks of the software. Such software may be executed by a computer, machine, processor, etc., provided to or as the apparatus 50, with input and output processing that produces the described results.

The mobile device 50 may be provided in a fixed or removably attached manner to any number of possible mobile subjects. The mobile subjects may be human, animal, mechanical, etc. For example, the mobile device 50 may be affixed to a dog collar which is worn by a dog, for the purpose of confining the dog to a prescribed area such as a yard of the home in which the dog's owner resides. This is merely one non-limiting example of how the mobile device 50 may be utilized.

The term "actionable", as used herein, refers to a position and/or speed value that has been determined and/or verified, for example, via mathematical processing, comparison, and/or extrapolation, to be of sufficient accuracy that the value can be trusted for purposes of determining whether to take a particular action, and/or to what extent a particular action should be taken, based on one or more characteristics of the "actionable" value. Raw data received from GNSS components and/or services that indicate position and speed are typically not of sufficient accuracy to be counted on for determining location and speed of an animal or object for purposes of determining boundary violations, but once the raw data has been further processed according to the example systems and methods of the present general inventive concept, the reliability and accuracy of the data may be determined to be of sufficient accuracy to be "actionable," reducing system susceptibility to false boundary violations.

In many example embodiments of the present general inventive concept described herein, a current actionable position and/or actionable speed is determined at least partially according to a previous actionable position and/or speed. In such example embodiments, a GNSS signal that is faulty due to interference and the like may be recognized by being outside of a reasonable range of difference from the prior actionable signal(s), and adjusted accordingly. Thus, rather than simply relying on actual transmitted GNSS position and speed data transmitted by the GNSS system, as typically done in conventional location devices and methods, the GNSS position and speed data is used to derive actionable position and speed data. In some conventional devices, the transmitted GNSS position and speed data is simply used in its transmitted form to locate the device receiving the signals. Some other conventional devices attempt to determine the accuracy of the received GNSS signals according to factors such as the number of satellite transmissions received, the signal-to-noise ratio of the satellite transmissions received, the grouping/location of the satellites transmitting the received signals, etc., and then default to other types of location services when the GNSS signals are not sufficient for location determination.

For example, upon determining the GNSS signals to be insufficient for proper location determination of the conventional subject device, the conventional subject device may switch to a terrestrial based wireless communication network to determine location in lieu of using the GNSS signals. Thus, by using such supplementary position data to dynamically determine a position without GNSS signal data, the additional data makes use of a non-GNSS positioning engine to replace the GNSS data. However, having such separate and switchable systems to provide non-GNSS supplementary data are problematic in that additional hardware and/or software is typically required, making mobile equipment such as animal trackers larger and heavier, and are also typically harder on the battery life of the device.

In example embodiments of the present general inventive concept, rather than have such a switchable system to change away from the GNSS signals, the current GNSS signals may be evaluated according to previously evaluated GNSS signals to determine their efficacy and/or adjust in a predetermined method to be more accurate. While conventional systems may store previous positioning data for tracking various points on a path of movement of an animal wearing such a conventional device, such data is not derived actionable data as discussed herein in regard to the present general inventive concept, and further not used to determine later actionable data.

The actionable GNSS position and speed determining apparatus 50, or mobile device 50, derives a mobile subject's actionable position and speed for applications such as, for example, GNSS fencing, boundary detection, containment, and so on. As previously described herein, the actionable position refers to a position which is relied upon for more accurate position and speed determination than only the GNSS derived position and speed. In various example embodiments of the present general inventive concept, the actionable position and speed may be quantities derived from the GNSS position and speed, confirmation of movement of the mobile device 50 from an independent motion detector, and one or more of GNSS signal metrics, GNSS solution metrics, and the previous determined actionable position and speed. The actionable position and speed may track the GNSS position and speed very closely under favorable signal conditions and with a confirmed modest speed. However, as GNSS signal conditions degrade, or GNSS speed decreases, the actionable position and speed may track the GNSS position and speed less closely. In situations in which the GNSS signal conditions and/or GNSS speed are below acceptable levels, the actionable position and speed may cease tracking the GNSS position and speed altogether. The determination of the actionable position and speed results in a much lower probability of false boundary violation determination.

Additionally, practical energy constraints typically require mobile devices to conserve energy whenever possible. For instance, if the mobile subject, and therefore the mobile device 50, is not in close proximity to any boundary segment of the containment area, and is motionless (as confirmed by the previously noted independent motion detector), an opportunity is available for the mobile device 50 to conserve energy by ceasing GNSS navigation. At a later point in time, when motion of the mobile subject is detected by the independent motion detector, the actionable position may be initialized as a location based upon the conditions that existed at the point at which the previous navigation was stopped. If the mobile subject was within or in close proximity to the containment area, the actionable position may be initialized as a known location, or "safe start", that is located within the containment area. The safe start location, which will be described in more detail later in this description, may be determined at the discretion of the owner or operator of the mobile device 50. Otherwise, if the mobile subject was not in close proximity to the containment area, the actionable position may be initialized with the last known actionable position. When re-starting navigation, a rapid "time-to-first-fix" may be maintained with pertinent assistance data provided over, for example, an RF communication link. Assistance data may be available to the mobile device 50 regardless of the navigation state of the mobile device 50, as a fixed "base" GNSS receiver may maintain and make available accurate time, pseudo-range corrections, ephemeris data, and an ionic correction model.

It is noted that the inclusion of an independent motion detector merely means that motion is detected independently of the processing of the GNSS signals received by the mobile device 50. According to various example embodiments, the independent motion detector may be a separately formed device provided to the mobile device 50, or integrated with the mobile device 50.

Referring to the example embodiment of the present general inventive concept illustrated in FIGS. 5A-5B, the actionable GNSS position and speed determining apparatus 50 includes a signal reception and corrections unit 51, a PVT engine 52, an actionable position & speed determination unit 53, first and second low-pass filters 54-1 and 54-2, an independent motion detector 55, first and second delay elements 56-1 and 56-2, a unit direction vector calculation unit 57, a boundary test unit 58, and a boundary vertices storage unit 59. Various other example embodiments of the present general inventive concept may include fewer, or additional, elements than those illustrated and discussed in regard to this example. Some or all of the described operations may be performed and/or controlled by software, and the various described units, elements, etc., may be functional blocks of the software.

The signal reception and corrections unit 51 receives GNSS PVT (position, velocity, time) determining signals for a time $(t+N\Delta t)$ from a number of GNSS satellites. The signal reception and corrections unit 51 may have an integrated receiver to directly receive the signals, or may receive the signals from an additional receiver (not shown). The signal reception and corrections unit 51 also receives GNSS assistance data in the form of pseudo-range error data from a fixed location GNSS assistance and pseudo-range error device, or a similar device to deliver such GNSS assistance data. After correcting the received satellite signals according to the pseudo-range error data, which is discussed in more detail later in this description, the signal reception and corrections unit 51 transmits the resulting data to the PVT engine 52. The signal reception and corrections unit 51 also transmits GNSS signal metrics data to the first and second low-pass filters 54-1 and 54-2.

The PVT engine 52 receives the corrected data from the signal reception and corrections unit 51, along with additional GNSS assistance data in the form of time assist and ephemeris assist data, and generates the GNSS position, GNSS speed, and several GNSS solution metrics, which are transmitted to the actionable position & speed determination unit 53. The processing of these several signals will be discussed in more detail later in this description.

The GNSS solution metrics processed and transmitted from the PVT engine 52 include a horizontal dilution of precision (HDOP) $Hor\_DOP(t+N\Delta t)$, an estimated horizontal position error $Est\_Hor\_Pos\_Err(t+N\Delta t)$, and an estimated speed error $Est\_Spd\_Err(t+N\Delta t)$. The GNSS position is noted in the drawing as $Pos(t+N\Delta t)$, and the GNSS speed is noted as $Spd(t+N\Delta t)$.

The first and second low-pass filters 54-1 and 54-2 process the data received from the signal reception and corrections unit 51 and respectively compute and transmit an average observable signal to noise ratio $Ave\_Obs\_SNR(t+N\Delta t)$, which is a quantity representative of the aggregate observable (all used GNSS signals) GNSS signal to noise ratio, and an average eligible signal to noise ratio $Ave\_Eli\_SNR(t+N\Delta t)$, which is a quantity representative of the aggregate eligible (all decodable GNSS signals emanating from satellites above a preset elevation threshold) GNSS signal to noise ratio, to the actionable position & speed determination unit 53. At each epoch (i.e., $\Delta t$) a new $Ave\_Obs\_SNR(t+N\Delta t)$ and a new $Ave\_Eli\_SNR(t+N\Delta t)$ are computed. These are each fed into the first and second low-pass filters 54-1 and 54-2. The first and second low-pass filters 54-1 and 54-2 function to allow a slow increase in each average and a rapid decrease in the average. The time constant for the increase may be on the order of $15*\Delta t$. The average observable signal to noise ratio and average eligible signal to noise ratio are referred to as GNSS signal metrics.

The actionable position & speed determination unit 53 receives the horizontal dilution of precision, estimated horizontal position error, estimated speed error, GNSS position, GNSS speed, average observable signal to noise ratio, average eligible signal to noise ratio, and prior actionable position and speed, and processes the actionable position Act_Pos(t+NΔt) and actionable speed Act_Spd(t+NΔt) accordingly. The actionable position & speed determination unit 53 also receives a confirmation signal from an independent motion detector 55 to determine how to process the actionable position and speed. The processing of this data is discussed in more detail later in this description.

The actionable position & speed determination unit 53 transmits the actionable position to a first delay element 56-1, the unit direction vector calculation unit 57, and the boundary test unit 58. The first delay element 56-1 introduces a delay d to the actionable position to generate and transmit a delayed actionable position Act_Pos(t+(N−d)Δt) to the unit direction vector calculation unit 57. The delayed actionable position is also fed back to the actionable position & speed determination unit 53. The unit direction vector calculation unit 57 receives the actionable position and the delayed actionable position and generates a unit direction vector U_Vector(t+NΔt), which is then transmitted to the boundary test unit 58.

The actionable position & speed determination unit 53 transmits the actionable speed to the second delay element 56-2 and the boundary test unit 58. The second delay element 56-2 introduces a delay d to the actionable speed to generate and transmit a delayed actionable speed Act_Spd(t+(N−d)Δt) back to the actionable position & speed determination unit 53.

The boundary test unit 58 receives the unit direction vector, the actionable position, the actionable speed and a signal indicating whether the GNSS position and speed fix is useable. The fix quality signal is transmitted to the boundary test 58 from the actionable position & speed determination unit 53. The boundary test unit 58 also receives the boundary vertices (a1,b1), (a2,b2), . . . (aN,bN) of the containment area from the boundary vertices storage unit 59. Using the received boundary vertices, actionable position, actionable speed, unit direction vector, and fix quality, the boundary test unit 58 generates data indicating whether the mobile device 50 is currently inside or outside of the containment area, the shortest distance from the mobile device 50 to the boundary of the containment area, and the shortest anticipated time to reach the boundary. As illustrated in FIG. 5B, the boundary test unit 58 outputs the results of these determinations as In/Out_test(t+NΔt), Distance_test(t+NΔt), and Time_test(t+NΔt). These resulting signals may be used to trigger a stimulus (not shown) that may be provided to, or in communication with, the device 50. The processing of this data will be described in more detail later in this description.

Various example embodiments and configurations thereof, such as the example illustrated in FIGS. 5A-5B, may provide a mobile device to track a mobile subject according to the present general inventive concept. According to an example embodiment of the present general inventive concept, a mobile device to track a mobile subject based on Global Navigation Satellite Systems data may include the motion detector 55 to detect motion of the mobile subject independently of the Global Navigation Satellite Systems data; the signal reception and corrections unit 51 configured to receive the Global Navigation Satellite Systems data and Global Navigation Satellite Systems assistance data, to correct received satellite data according to the Global Navigation Satellite Systems assistance data, and to transmit resulting data; the position, velocity, time (PVT) engine 52 configured to receive the resulting data from the signal reception and corrections unit 51 and to generate position and speed solution metrics according to the corrected data and additional Global Navigation Satellite Systems assistance data; the first and second low pass filters 54-1 and 54-2 configured to receive the resulting data from the signal reception and corrections unit 51, the first and second low pass filters 54-1 and 54-2 being configured to compute and transmit an average signal to noise ratio; the actionable position and speed determination unit 53 configured to receive the position and speed solution metrics and the average signal to noise ratio to determine a current actionable position and a current actionable speed of the mobile subject according to estimate parameters derived from one or more previous actionable speeds and actionable positions; and the boundary test unit 58 to evaluate a boundary violation according to a current actionable position and a current actionable speed of the mobile subject relative to a predetermined boundary.

Various operations which may be performed according to various embodiments of the present general inventive concept will be described below.

Figure 6:
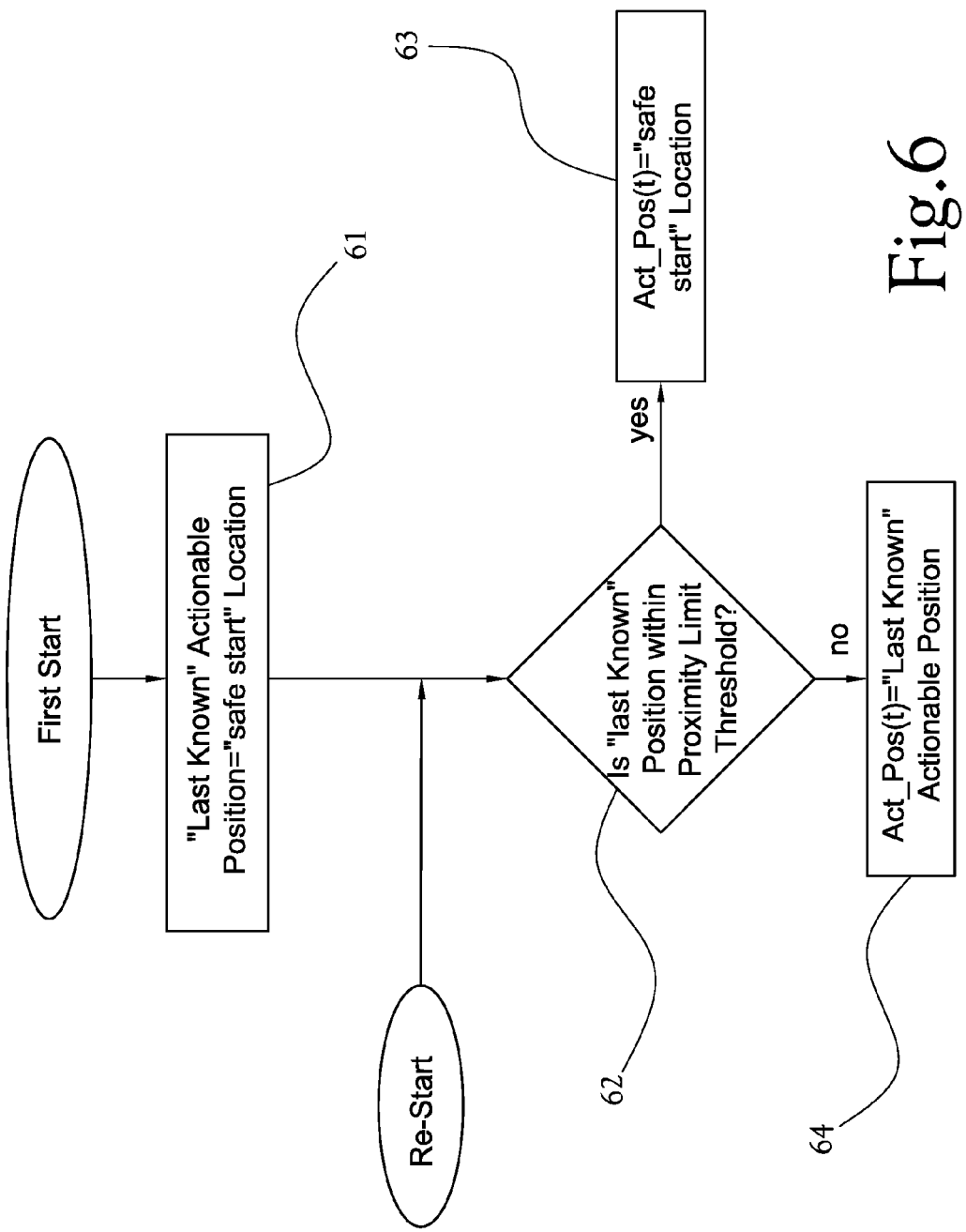
FIG. 6 is a flow chart illustrating the initialization of an actionable position according to an embodiment of the present general inventive concept.

FIG. 6 is a flow chart illustrating the initialization of an actionable position according to an embodiment of the present general inventive concept. Upon first starting a navigation procedure using the mobile device 50, the safe start location is set as the last known actionable position in operation 61. If the mobile device 50 is undergoing a re-start due to the detected motion, or a reset, rather than a first start, then a last known actionable position is already stored.

In operation 62, it is determined whether the last known actionable position is located within the proximity limit threshold of the containment area. If the last known actionable position is determined to be located within the proximity limit threshold, the safe start location is set as the actionable position Act_Pos(t) in operation 63. If the last known actionable position is determined to not be within the proximity limit threshold, the last known actionable position is set as the actionable position Act_Pos(t) in operation 64.

FIG. 7 illustrates the computation of a position difference Pos_Dif(t+NΔt) between a current GNSS position GNSS_Pos(t+NΔt) and the prior actionable position Act_Pos(t+(N−1)Δt) according to an embodiment of the present general inventive concept. The position difference Pos_Dif(t+NΔt), computed in the difference unit 71, may be used as described in a later operation.

FIG. 8 illustrates the computation of a short term GNSS solution metric based on HDOP and an estimated horizontal position error according to an embodiment of the present general inventive concept. This computation may be performed in the actionable position & speed determination unit 53 of the mobile device 50. As indicated in FIG. 8, the horizontal dilution of precision (HDOP) Hor_DOP(t+NΔt) and the estimated horizontal position error Est_Hor_Pos_Err(t+NΔt) are entered into an error position unit 81 to generate an HDOP error position HDOP_Err_Pos(t+NΔt). A short term filter 82 receives the HDOP error position HDOP_Err_Pos(t+NΔt), as well as a delayed short term HDOP error position ST_HDOP_Err_Pos(t+(N−1)Δt) that is fed back from a delay element 83, to generate and output a short term HDOP error position ST_HDOP_Err_Pos(t+NΔt). The output short term HDOP error position ST_HDOP_Err_Pos(t+NΔt) is also received by the delay element 83, and used to generate the delayed short term HDOP error position ST_HDOP_Err_Pos(t+(N−1)Δt). The short term time constant may be on the order of 3*Δt.

Figure 9:
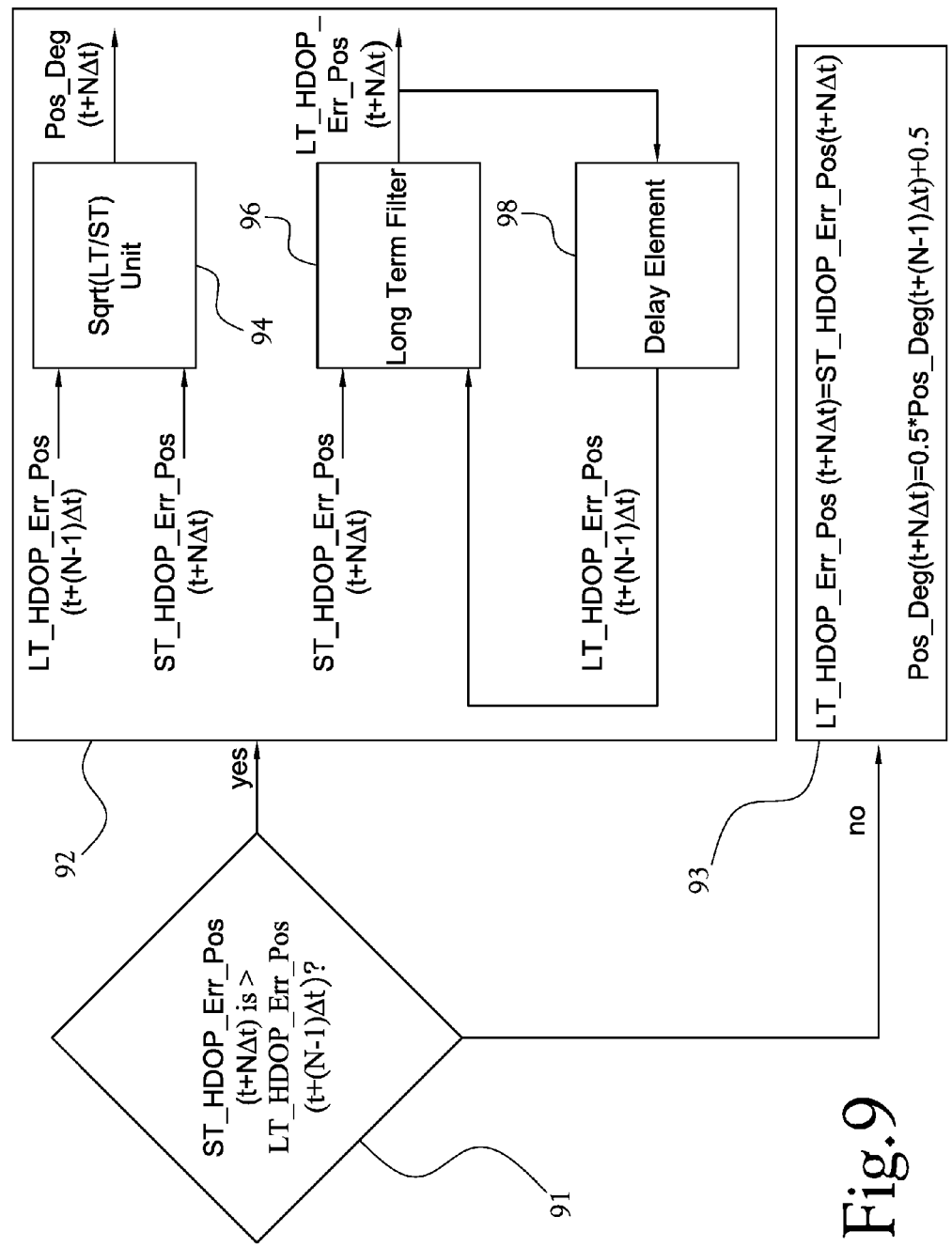
FIG. 9 is a flow chart illustrating the computation of an initial position degradation factor and a long term GNSS solution metric based on HDOP and an estimated horizontal position error according to an embodiment of the present general inventive concept.

FIG. 9 is a flow chart illustrating the computation of an initial position degradation factor and a long term GNSS solution metric according to an embodiment of the present general inventive concept. It is noted that the term "factor" may be represented by the term "coefficient" in some of the example embodiments described herein. In operation 91, it is determined whether the short term HDOP error position ST_HDOP_Err_Pos(t+NΔt) is greater than a delayed long term HDOP error position LT_HDOP_Err_Pos(t+(N−1)Δt). If the short term HDOP error position is greater than the delayed long term HDOP error position, then operation 92 is performed, in which the short term error position and the delayed long term HDOP error position are entered into a Sqrt(LT/ST) unit 94, which generates and outputs an initial position degradation factor Pos_Deg(t+NΔt). Also, the short term HDOP error position and the delayed long term HDOP error position are received by a long term filter 96, which generates a long term HDOP error position LT_HDOP_Err_Pos(t+NΔt). The long term HDOP error position is also fed back into a delay element 98, which generates the delayed long term HDOP error position LT_HDOP_Err_Pos(t+(N−1)Δt) and transmits same to the long term filter 96. The long term time constant may be on the order of 20*Δt.

If the short term HDOP error position is not greater than the delayed long term HDOP error position, then the long term HDOP error position LT_HDOP_Err_Pos(t+NΔt) is set to be equal to the short term HDOP error position, and the position degradation factor Pos_Deg(t+NΔt) is set to be equal to 0.5*Pos_Deg(t+(N−1)Δt)+0.5, wherein Pos_Deg(t+(N−1)Δt) is a delayed or last position degradation factor, in operation 93.

Figure 10:
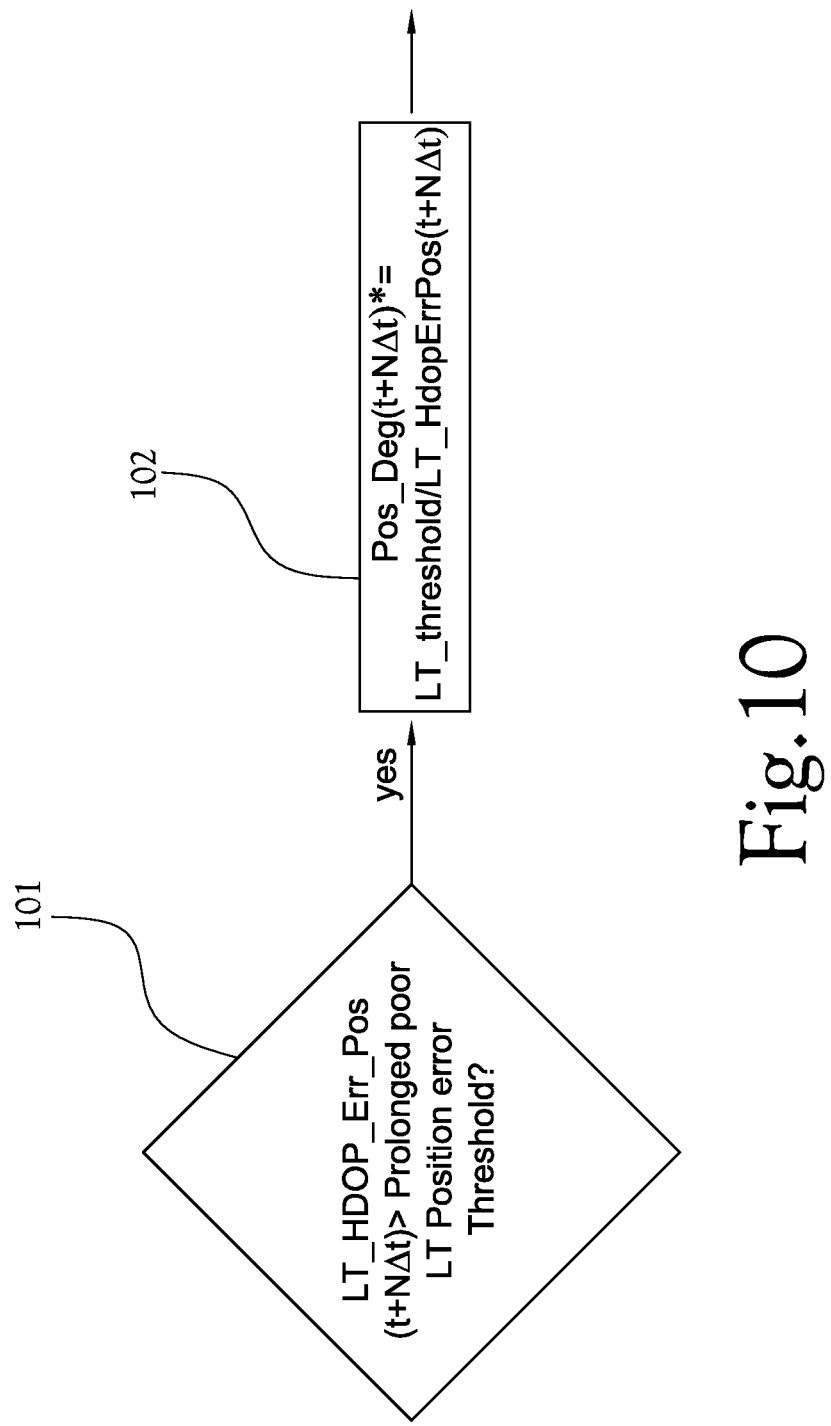
FIG. 10 is a flow chart illustrating the computation of a further position degradation factor based on a long term solution metric and a constant indicative of a prolonged poor long term position error threshold according to an embodiment of the present general inventive concept.

FIG. 10 is a flow chart illustrating the computation of a further position degradation factor based on a long term solution metric and a constant indicative of a prolonged poor long term position error threshold according to an embodiment of the present general inventive concept. In operation 101 it is determined whether the long term HDOP error position LT_HDOP_Err_Pos(t+NΔt) is greater than a constant LT_threshold that is indicative of a prolonged poor long term position error threshold. If the long term HDOP error position is greater than LT_threshold, then the further position degradation factor Pos_Deg(t+NΔt) is multiplied by the LT-threshold divided by the long term HDOP error position in operation 102.

Figure 11:
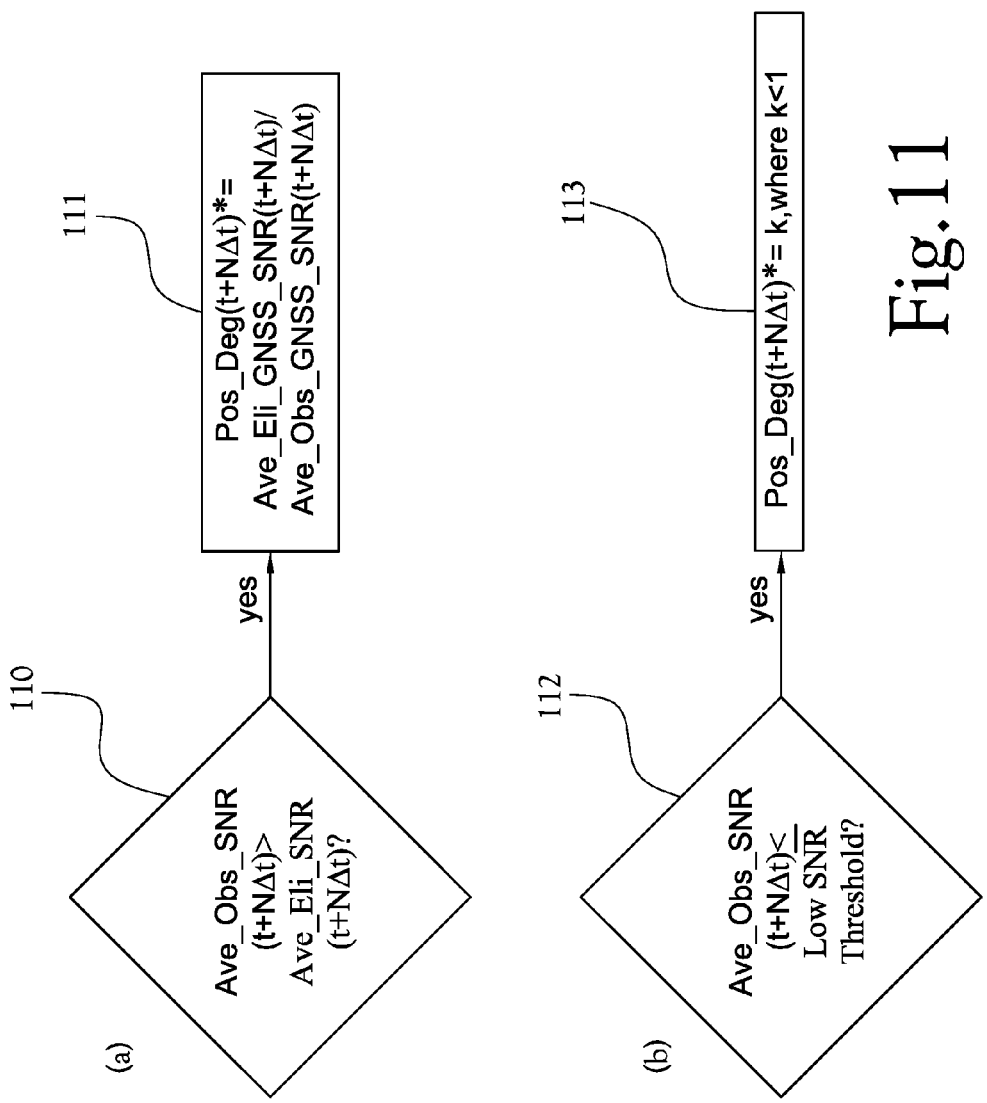
FIG. 11 is a flow chart illustrating the computation of a further position degradation factor based on GNSS signal metrics according to an embodiment of the present general inventive concept.

FIG. 11 is a flow chart illustrating the computation of a further position degradation factor based on GNSS signal metrics according to an embodiment of the present general inventive concept. In operation 110 it is determined whether an average observable signal to noise ratio Ave_Obs_SNR(t+NΔt), which is a quantity representative of the aggregate observable (all used GNSS signals) GNSS signal to noise ratio, is greater than an average eligible signal to noise ratio Ave-Eli_SNR(t+NΔt), which is a quantity representative of the aggregate eligible (all decodable GNSS signals emanating from satellites above a preset elevation threshold) GNSS signal to noise ratio. If the average observable signal to noise ratio is greater than the average eligible signal to noise ratio, the further position degradation factor Pos_Deg(t+NΔt) is multiplied by the average eligible signal to noise ratio divided by the average observable signal to noise ratio in operation 111. Thus, the position degradation factor, as illustrated in FIGS. 9-11, is a function of most recent and prior GNSS position solution metrics and GNSS signal metrics.

It is also determined whether the average observable signal to noise ratio is less than or equal to a low SNR threshold in operation 112. If the average observable signal to noise ratio is less than or equal to the low SNR threshold, then the further position degradation factor Pos_Deg(t+NΔt) is multiplied by a constant k, where k is a constant and less than one, in operation 113.

Figure 12:
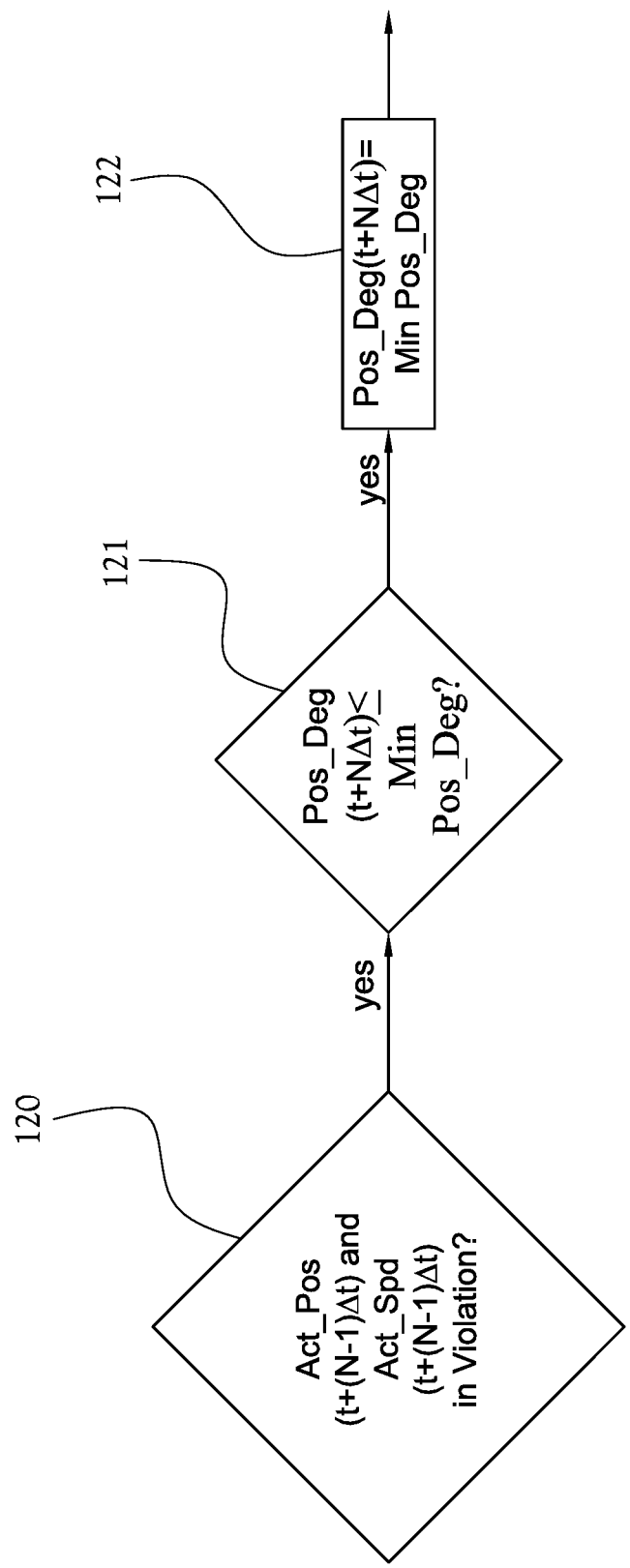
FIG. 12 is a flow chart illustrating the limiting of the position degradation factor according to an embodiment of the present general inventive concept.

FIG. 12 is a flow chart illustrating the limiting of the position degradation factor according to an embodiment of the present general inventive concept. In operation 120, it is determined whether the last known actionable position Act_Pos(t+(N−1)Δt) and last known actionable speed Act_Spd(t+(N−1)Δt) resulted in a boundary violation. If it is determined that a boundary violation indeed occurred, it is determined whether the position degradation factor Pos_Deg(t+NΔt) is less than a minimum position degradation factor PosDegrade in operation 121. If the position degradation factor is less than the minimum position degradation factor, the position degradation factor is set to be equal to the minimum position degradation factor in operation 122.

Figure 13:
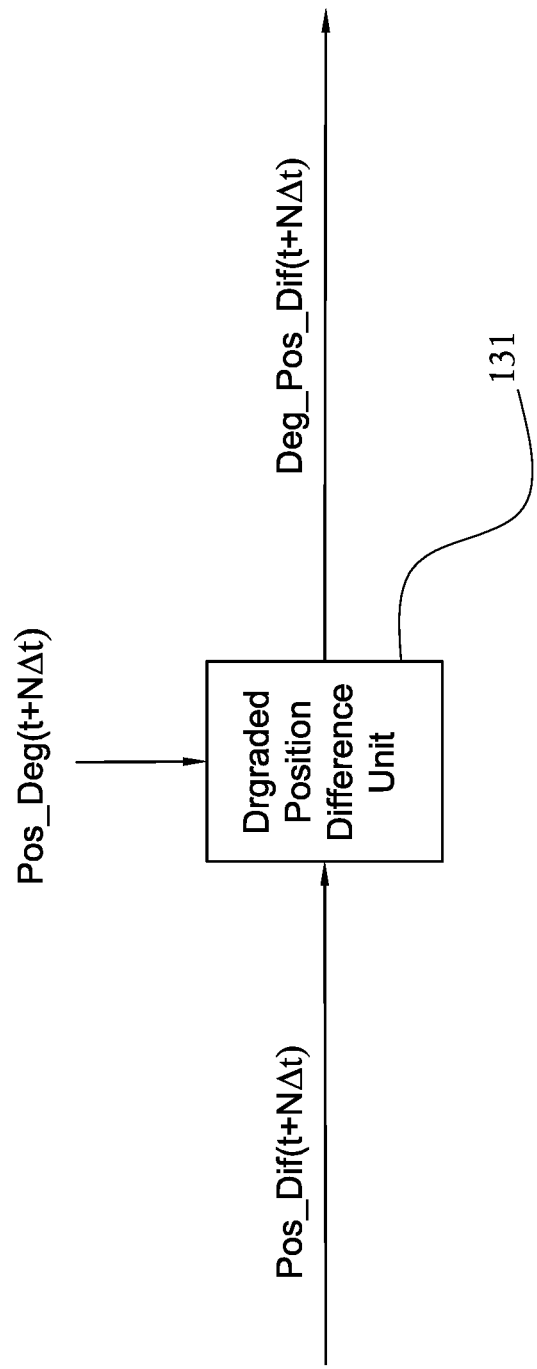
FIG. 13 illustrates the computation of a degraded position difference according to an embodiment of the present general inventive concept.

FIG. 13 illustrates the computation of a degraded position difference according to an embodiment of the present general inventive concept. Both the position difference Pos_Dif(t+NΔt) and the position degradation factor Pos_Deg(t+NΔt) are received by a degraded position difference unit 131, which then generates and outputs a degraded position difference Deg_Pos_Dif(t+NΔt).

Figure 14:
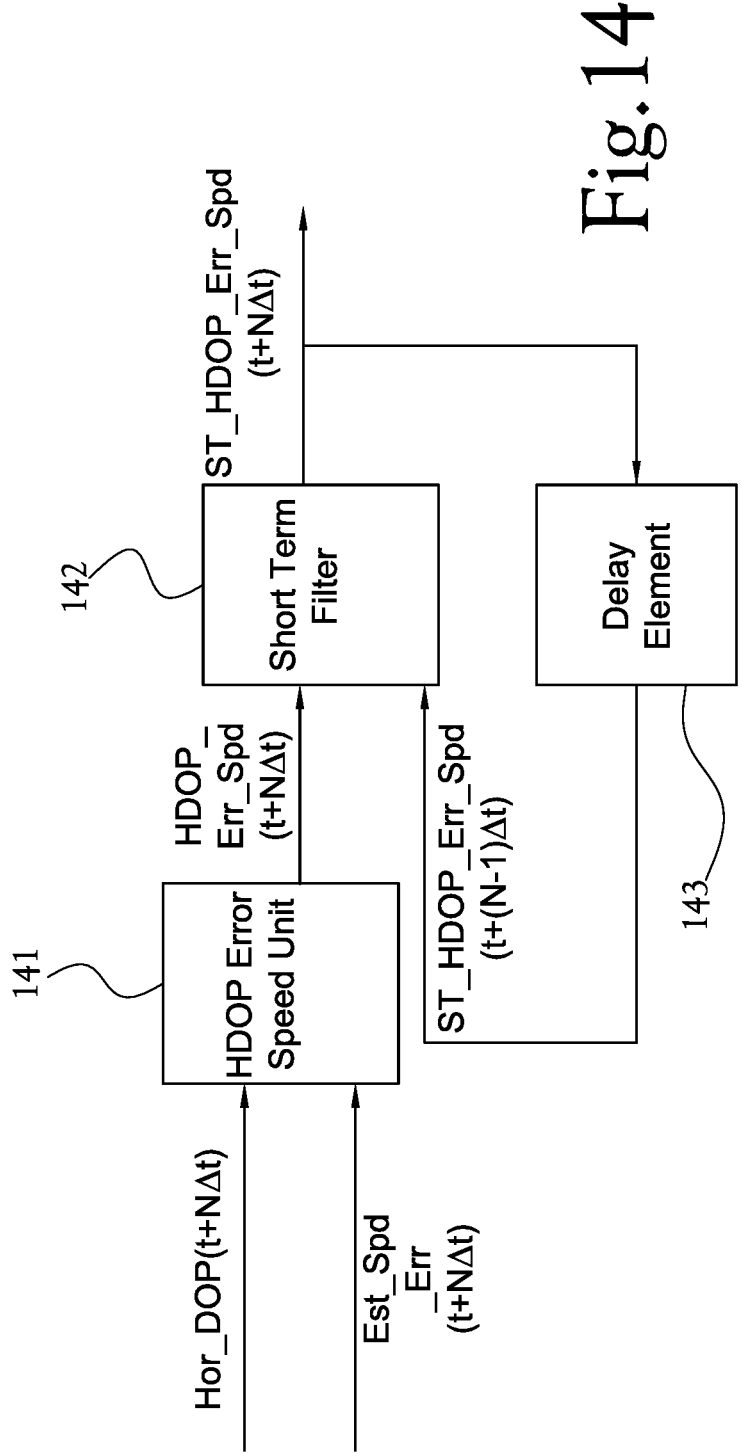
FIG. 14 illustrates the computation of a short term GNSS solution metric based on HDOP and an estimated speed error according to an embodiment of the present general inventive concept.

FIG. 14 illustrates the computation of a short term GNSS solution metric based on HDOP and an estimated speed error according to an embodiment of the present general inventive concept. This computation may be performed in the actionable position & speed determination unit 53 of the mobile device 50. As indicated in FIG. 14, the horizontal dilution of precision (HDOP) Hor_DOP(t+NΔt) and the estimated speed error Est_Spd_Err(t+NΔt) are entered into an HDOP error speed unit 141 to generate an HDOP error speed HDOP_Err_Spd(t+NΔt). A short term filter 142 receives the HDOP error speed HDOP_Err_Spd(t+NΔt), as well as a delayed short term HDOP error speed ST_HDOP_Err_Spd(t+(N−1)Δt) that is fed back from a delay element 143, to generate and output a short term HDOP error speed ST_HDOP_Err_Spd(t+NΔt). The output short term HDOP error speed ST_HDOP_Err_Spd(t+NΔt) is also received by the delay element 143, and used to generate the delayed short term HDOP error speed ST_HDOP_Err_Spd(t+(N−1)Δt). The short term time constant may be on the order of 3*Δt.

Figure 15:
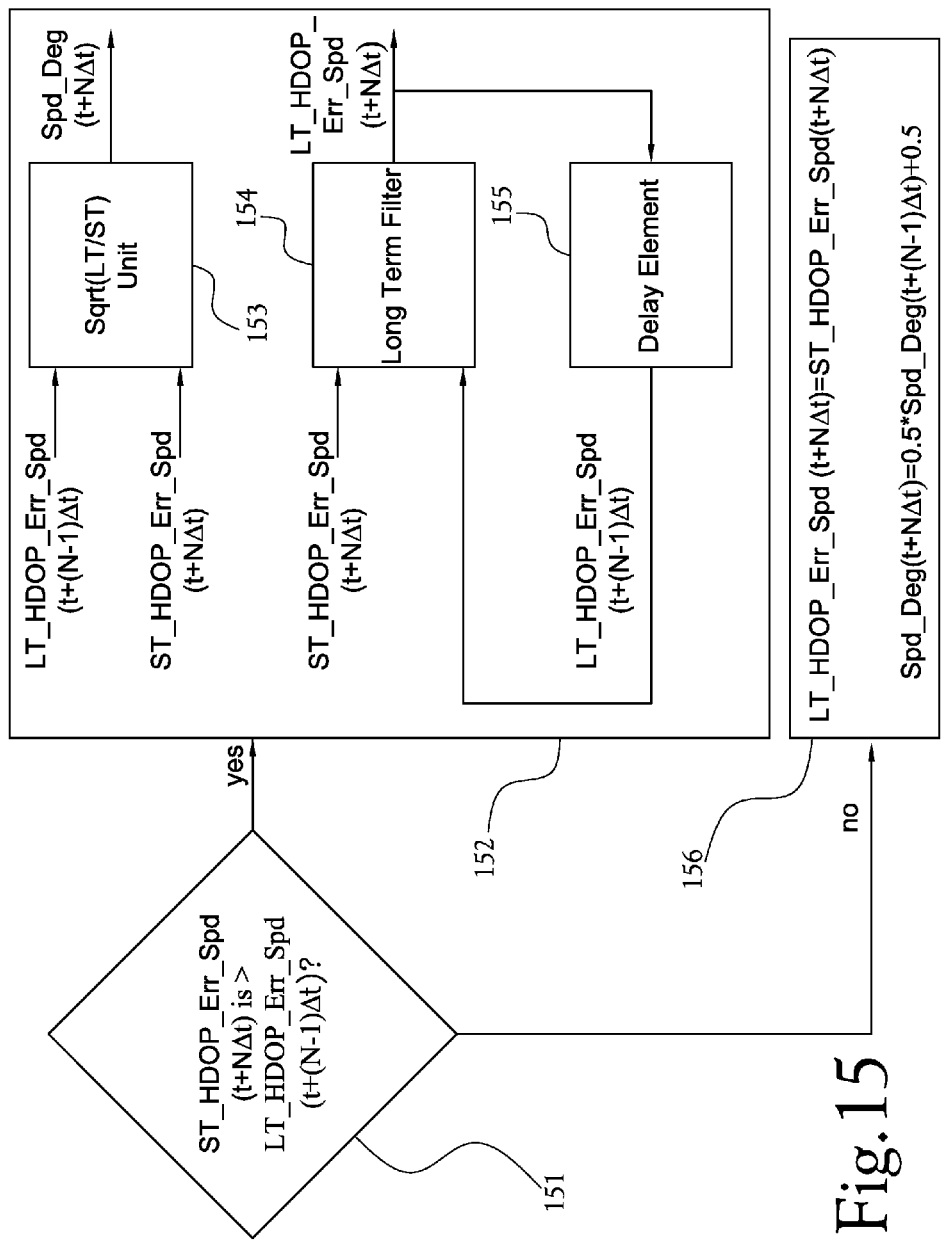
FIG. 15 is a flow chart illustrating the computation of an initial speed degradation factor and a long term GNSS solution metric based on HDOP and an estimated speed error according to an embodiment of the present general inventive concept.

FIG. 15 is a flow chart illustrating the computation of an initial speed degradation factor and a long term GNSS solution metric based on HDOP and an estimated speed error according to an embodiment of the present general inventive concept. In operation 151, it is determined whether the short term HDOP error speed ST_HDOP_Err_Spd(t+NΔt) is greater than a delayed long term HDOP error speed LT_HDOP_Err_Spd(t+(N−1)Δt). If the short term HDOP error speed is greater than the delayed long term HDOP error speed, then operation 152 is performed, in which the short term error speed and the delayed long term HDOP error speed are entered into a Sqrt(LT/ST) unit 153, which generates and outputs a speed degradation factor Spd_Deg(t+NΔt). Also, the short term HDOP error speed and the delayed long term HDOP error speed are received by a long term filter 154, which generates a long term HDOP error speed LT_HDOP_Err_Spd(t+NΔt). The long term HDOP error speed is also fed back into a delay element 155, which generates the delayed long term HDOP error speed LT_H-

DOP_Err_Spd(t+(N−1)Δt) and transmits same to the long term filter 154. The long term time constant may be on the order of 20*Δt.

If the short term HDOP error speed is not greater than the delayed long term HDOP error speed, then the long term HDOP error speed LT_HDOP_Err_Spd(t+NΔt) is set to be equal to the short term HDOP error speed, and the speed degradation factor Spd_Deg(t+NΔt) is set to be equal to 0.5*Spd_Deg(t+(N−1)Δt)+0.5, wherein Spd_Deg(t+(N−1)Δt) is a delayed or last speed degradation factor, in operation 156.

Figure 16:
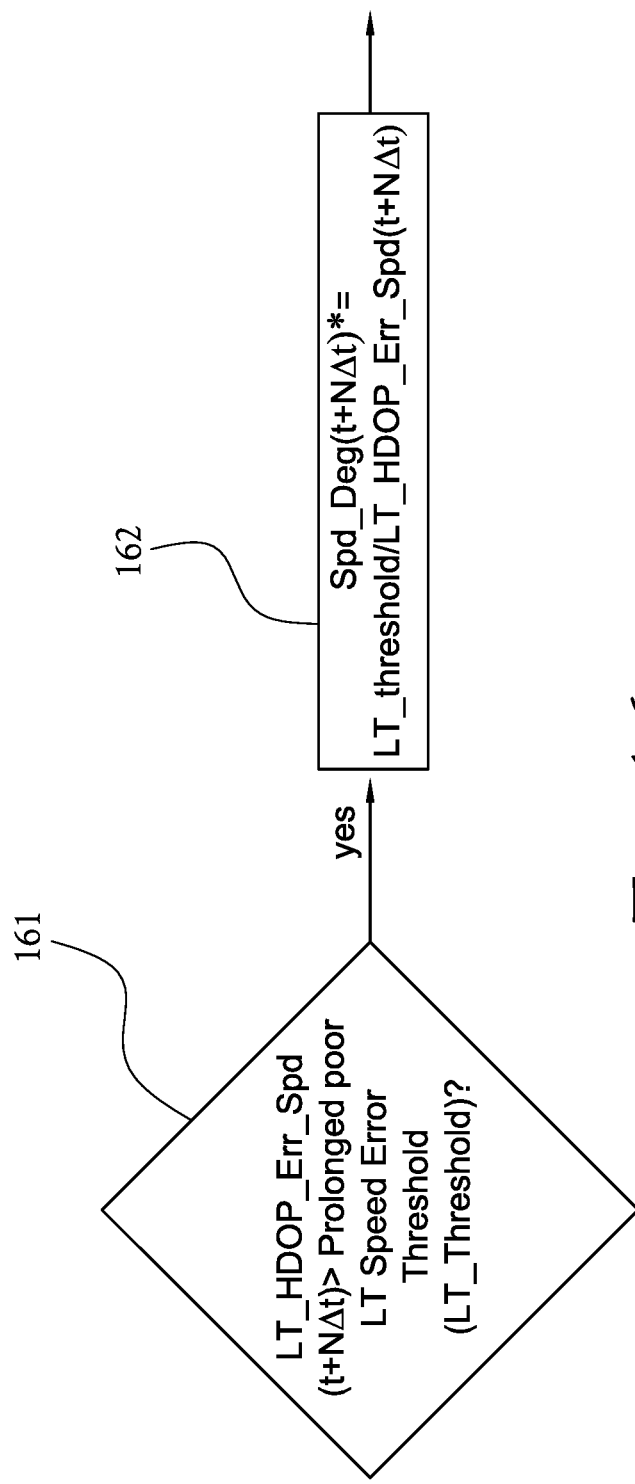
FIG. 16 is a flow chart illustrating the computation of a further speed degradation factor based on a long term solution metric and a constant indicative of a prolonged poor long term speed error threshold according to an embodiment of the present general inventive concept.

FIG. 16 is a flow chart illustrating the computation of a further speed degradation factor based on a long term solution metric and a constant indicative of a prolonged poor long term speed error threshold according to an embodiment of the present general inventive concept. In operation 161 it is determined whether the long term HDOP error speed LT_HDOP_Err_Spd(t+NΔt) is greater than a constant LT_threshold that is indicative of a prolonged poor long term speed error threshold. If the long term HDOP error speed is greater than LT_threshold, then the further speed degradation factor Spd_Deg(t+NΔt) is multiplied by the LT-threshold divided by the long term HDOP speed position in operation 162.

Figure 17:
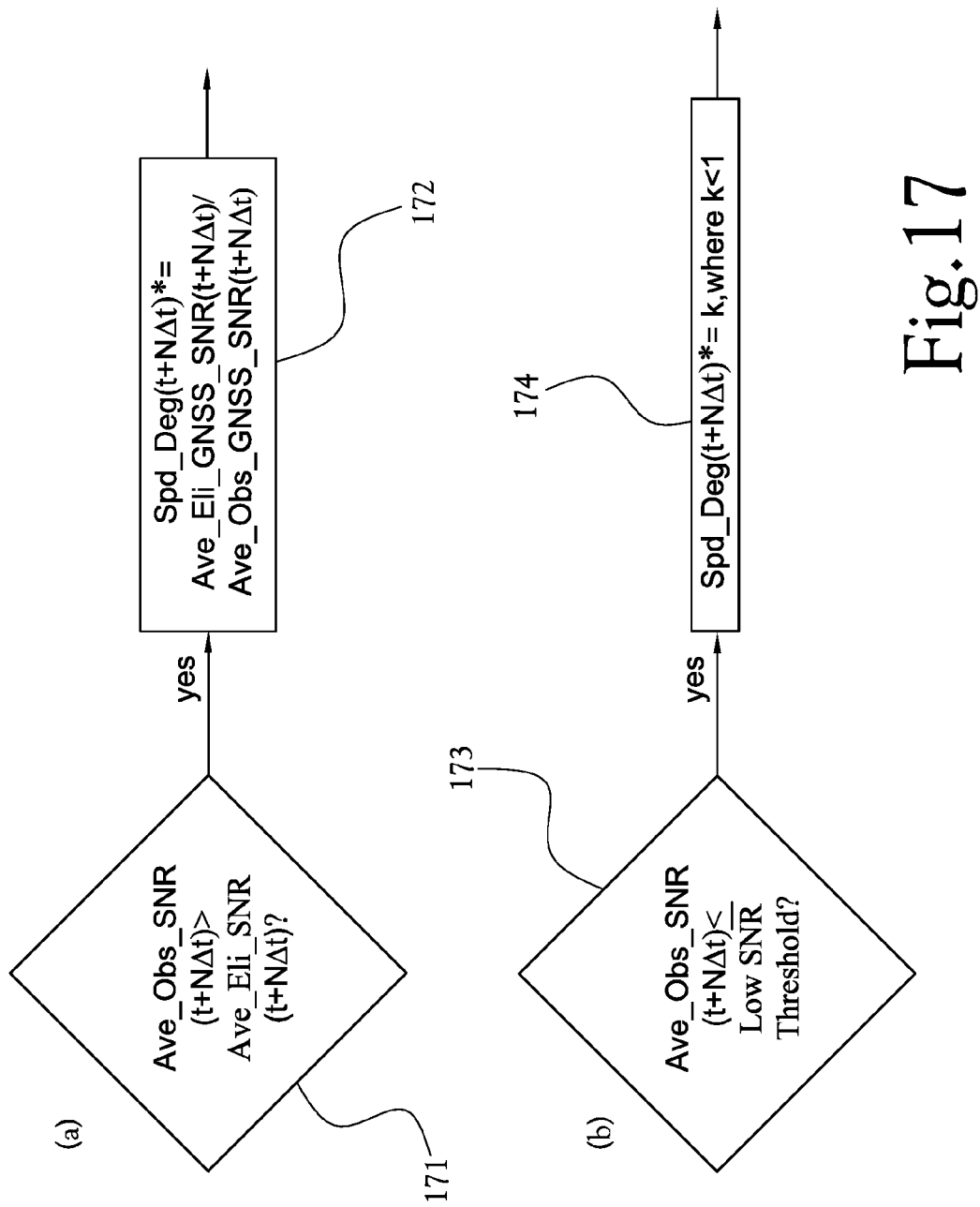
FIG. 17 is a flow chart illustrating the computation of a further speed degradation factor based on GNSS signal metrics according to an embodiment of the present general inventive concept.

FIG. 17 is a flow chart illustrating the computation of a further speed degradation factor based on GNSS signal metrics according to an embodiment of the present general inventive concept. In operation 171 it is determined whether the average observable signal to noise ratio Ave_Obs_SNR ((t+NΔt), which is a quantity representative of the aggregate observable (all decodable GNSS signals) GNSS signal to noise ratio, is greater than the average eligible signal to noise ratio Ave-Eli_SNR(t+NΔt), which is a quantity representative of the aggregate eligible (all GNSS signals emanating from satellites above a preset elevation threshold) GNSS signal to noise ratio. If the average observable signal to noise ratio is greater than the average eligible signal to noise ratio, the further speed degradation factor Spd_Deg(t+NΔt) is multiplied by the average eligible signal to noise ratio divided by the average observable signal to noise ratio in operation 172. Thus, the speed degradation factor, as illustrated in FIGS. 15-17, is a function of most recent and prior GNSS speed solution metrics, and a function of the GNSS signal metrics. Such GNSS position solution metrics, GNSS speed solution metrics, and GNSS signal metrics would be readily recognized by one skilled in the art as encompassing the data received and determined as described herein.

It is also determined whether the average observable signal to noise ratio is less than or equal to the low SNR threshold in operation 173. If the average observable signal to noise ratio is less than or equal to the low SNR threshold, then the further speed degradation factor Spd_Deg(t+NΔt) is multiplied by k, where k is a constant and less than one, in operation 174.

Figure 18:
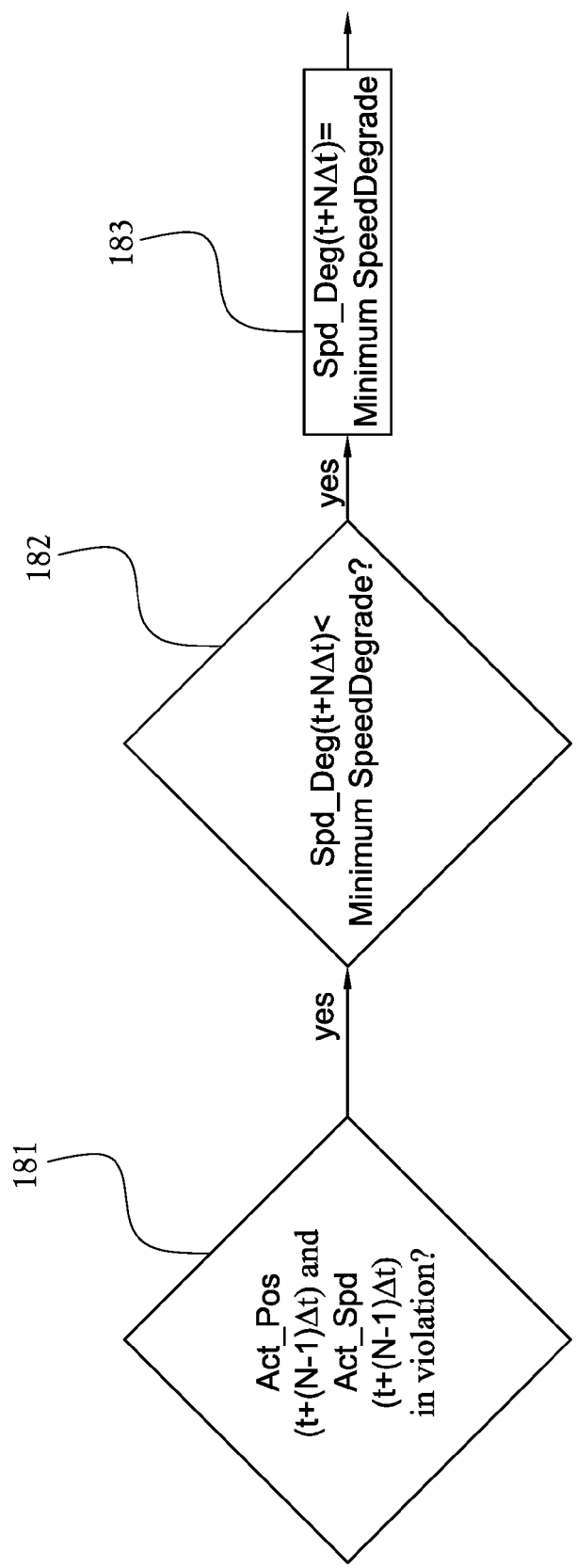
FIG. 18 is a flow chart illustrating the limiting of the speed degradation factor according to an embodiment of the present general inventive concept.

FIG. 18 is a flow chart illustrating the limiting of the speed degradation factor according to an embodiment of the present general inventive concept. In operation 181, it is determined whether the last known actionable position Act_Pos (t+(N−1)Δt) and last known actionable speed Act_Spd(t+(N−1)Δt) resulted in a boundary violation. If it is determined that a boundary violation indeed occurred, it is determined whether the speed degradation factor Spd_Deg(t+NΔt) is less than a minimum speed degradation factor SpeedDegrade in operation 182. If the speed degradation factor is less than the minimum speed degradation factor, the speed degradation factor is set to be equal to the minimum position degradation factor in operation 183.

Figure 19:
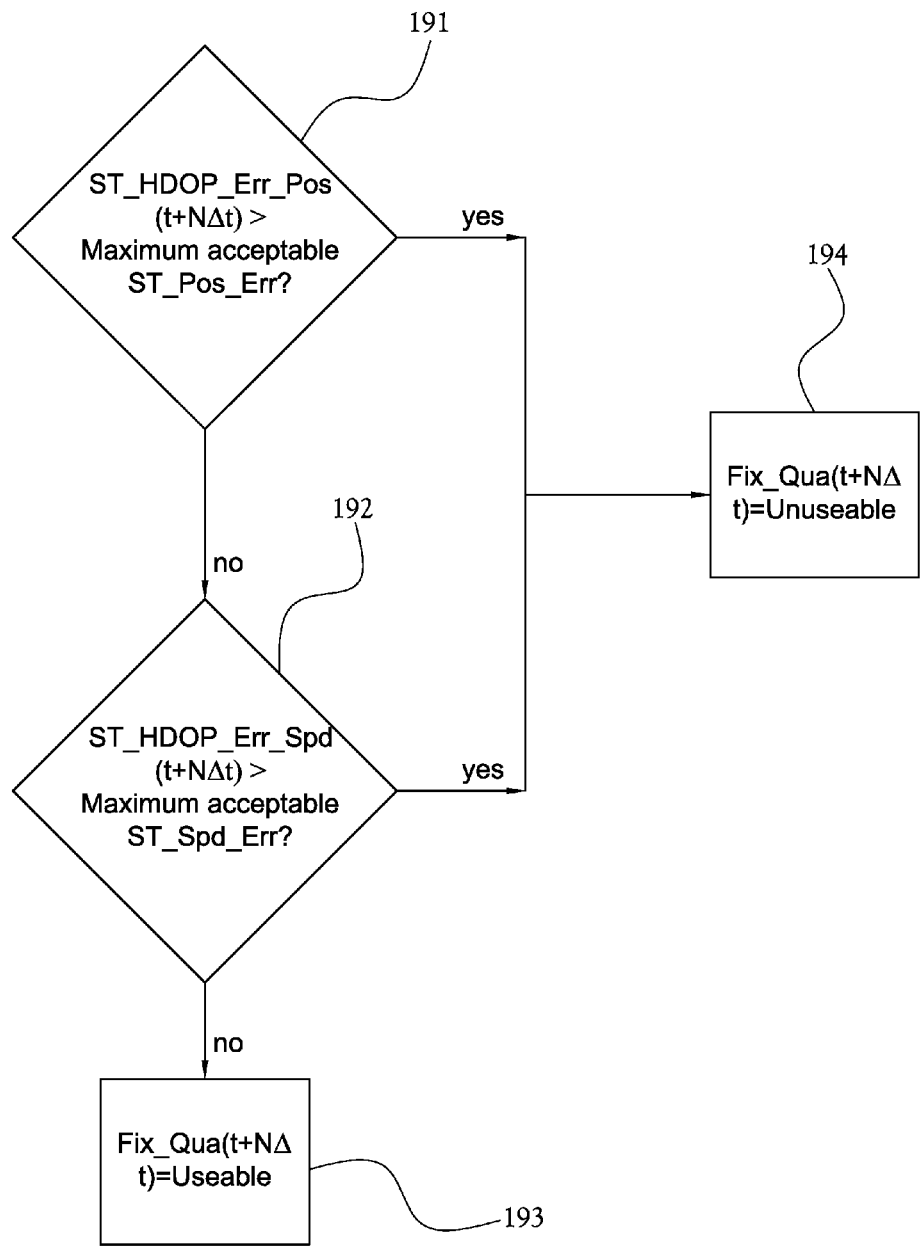
FIG. 19 is a flow chart illustrating a determination of the GNSS position and speed being useable or unuseable based on the short term GNSS solution metrics according to an embodiment of the present general inventive concept.

FIG. 19 is a flow chart illustrating a determination of the GNSS position and speed being useable or unuseable based on the short term GNSS solution metrics according to an embodiment of the present general inventive concept. In operation 191, it is determined whether the short term HDOP error position ST_HDOP_Err_Pos(t+NΔt) is greater than the maximum acceptable short term position error ST_Pos_Err. If the short term HDOP error position is not greater than the maximum acceptable short term position error, it is then determined whether the short term HDOP error speed ST_HDOP_Err_Spd(t+NΔt) is greater than the maximum acceptable short term speed error ST_Spd_Err in operation 192. If the short term HDOP error speed is not greater than the maximum acceptable short term speed error, then the GNSS position and speed, or fix, is determined to be useable. This is indicated in operation 193, in which the fix quality FixQuality(t+NΔt) is set as useable.

If the short term HDOP error position is greater than the maximum acceptable short term position error, or if the short term HDOP error speed is greater than the maximum acceptable short term speed error, then the fix quality is determined to be unuseable in operation 194.

Figure 20:
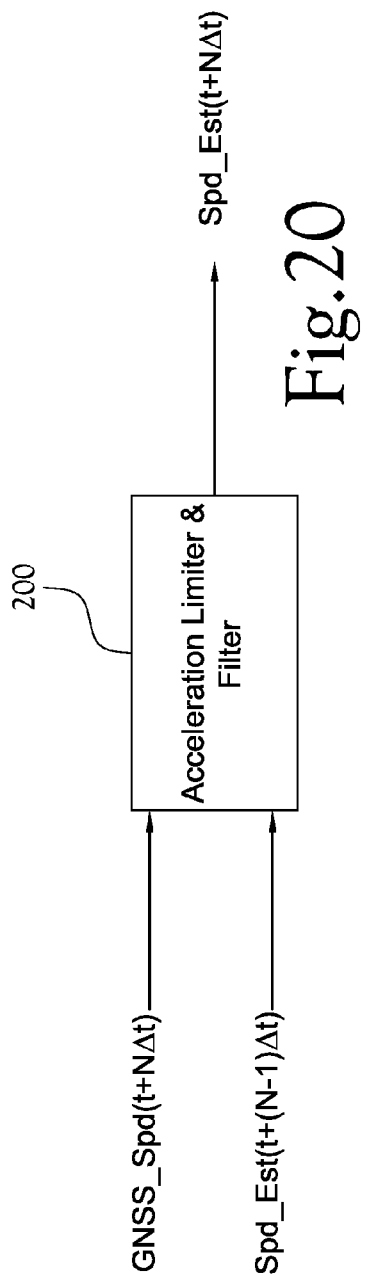
FIG. 20 illustrates the computation of a speed estimate based on mobile subject attributes according to an embodiment of the present general inventive concept.

FIG. 20 illustrates the computation of a speed estimate based on mobile subject attributes according to an embodiment of the present general inventive concept. As illustrated, the GNSS speed GNSS_Spd(t+NΔt) and a delayed speed estimate Spd_Est(t+(N−1)Δt) are received by an acceleration limiter & filter 200, which then generates the speed estimate Spd_Est(t+NΔt) according to the attributes of the mobile subject. These attributes may be entered into the mobile device 50 by a user. The attributes may include information regarding, for example, known physical capabilities, the type of mobile subject (e.g., dog, cow, human, etc.), and so on.

Figure 21:
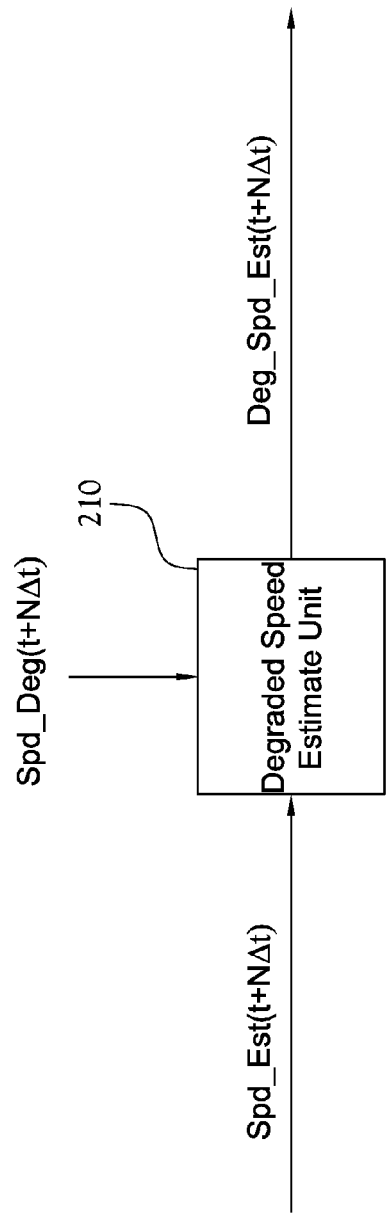
FIG. 21 illustrates the computation of a degraded speed estimate according to an embodiment of the present general inventive concept.

FIG. 21 illustrates the computation of a degraded speed estimate according to an embodiment of the present general inventive concept. As illustrated, a speed degradation factor Spd_Deg(t+NΔt) and the speed estimate Spd_Est(t+NΔt) are received by a degraded speed estimate unit 210, which generates the degraded speed estimate Deg_Spd_Est(t+NΔt) accordingly.

Figure 22:
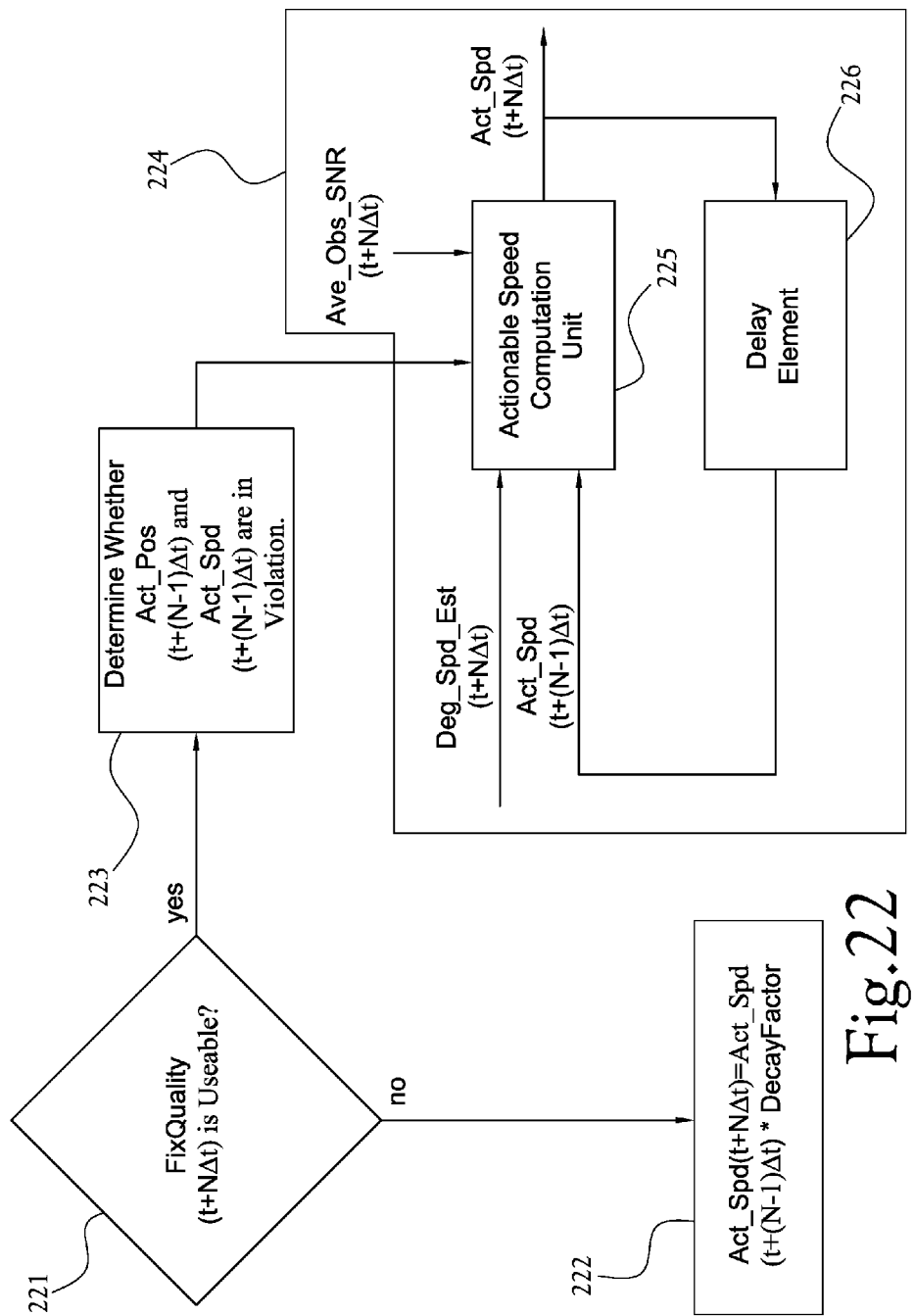
FIG. 22 is a flow chart illustrating the computation of an actionable speed based on a GNSS fix quality according to an embodiment of the present general inventive concept.

FIG. 22 is a flow chart illustrating the computation of an actionable speed based on a GNSS fix quality according to an embodiment of the present general inventive concept. In operation 221 it is determined whether the value of the fix quality FixQuality(t+NΔt) is useable. If the fix quality is not useable, the actionable speed is caused to decay towards zero as indicated in operation 222, in which the actionable speed Act_Spd(t+NΔt) is set to be equal to the delayed actionable speed Act_Spd(t+(N−1)Δt) multiplied by a decay factor. If the fix quality is useable, in operation 223 it is determined whether the delayed actionable position Act_Pos (t+(N−1)Δt) and delayed actionable speed Act_Spd(t+(N−1)Δt) are in a boundary violation. As illustrated, the average observable signal to noise ratio Ave_Obs_SNR(t+NΔt), degraded speed estimate Deg_Spd_Est(t+NΔt), delayed actionable speed Act_Spd(t+(N−1)Δt), and knowledge of whether the last actionable position and speed resulted in a boundary violation are input to an actionable speed computation unit 225, which generates the actionable speed Act_Spd(t+NΔt). Also, the actionable speed output by the actionable speed computation unit 225 is also fed back to a delay element 226 which generates the delayed actionable speed Act_Spd(t+(N−1)Δt).

Figure 23:
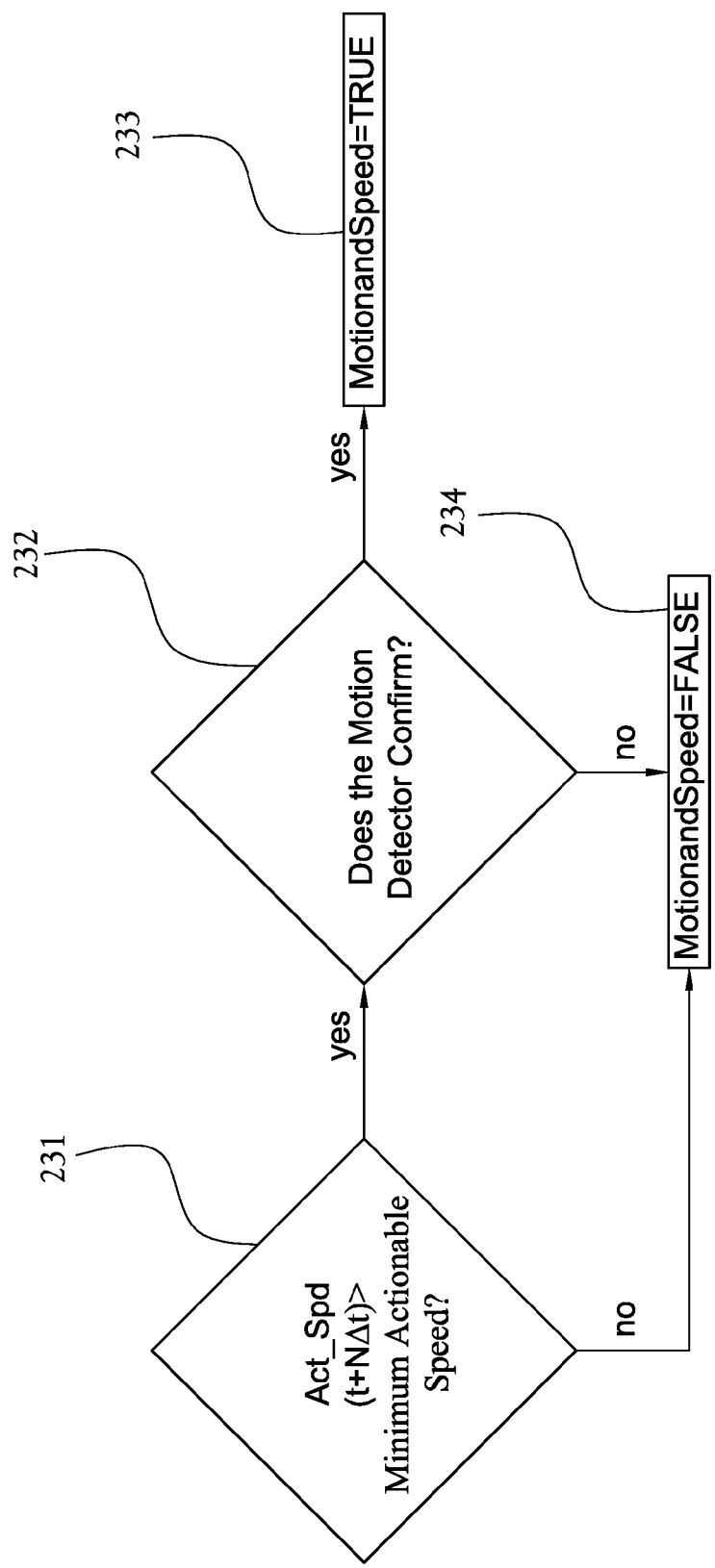
FIG. 23 is a flow chart illustrating a testing of the actionable speed against a minimum actionable speed constant and motion detector results according to an embodiment of the present general inventive concept.

FIG. 23 is a flow chart illustrating a testing of the actionable speed against a minimum actionable speed constant and motion detector results according to an embodiment of the present general inventive concept. In operation 231 it is determined whether the actionable speed Act_Spd (t+NΔt) is greater than a minimum actionable speed constant. If the actionable speed is determined to be greater than the constant, in operation 232 it is determined whether the independent motion detector confirms movement of the mobile device. If it is determined that there is no movement confirmed by the independent motion detector, then it is determined that there is no actual motion and speed of the mobile device in operation 234, and a MotionandSpeed value is set to false. If it is determined that there is movement confirmed by the independent motion detector, then the MotionandSpeed value is set to true in operation 233. If the Act_Spd(t+NΔt) is determined to be less than the minimum actionable speed in operation 231, the MotionandSpeed value is set to false in operation 234.

Figure 24:
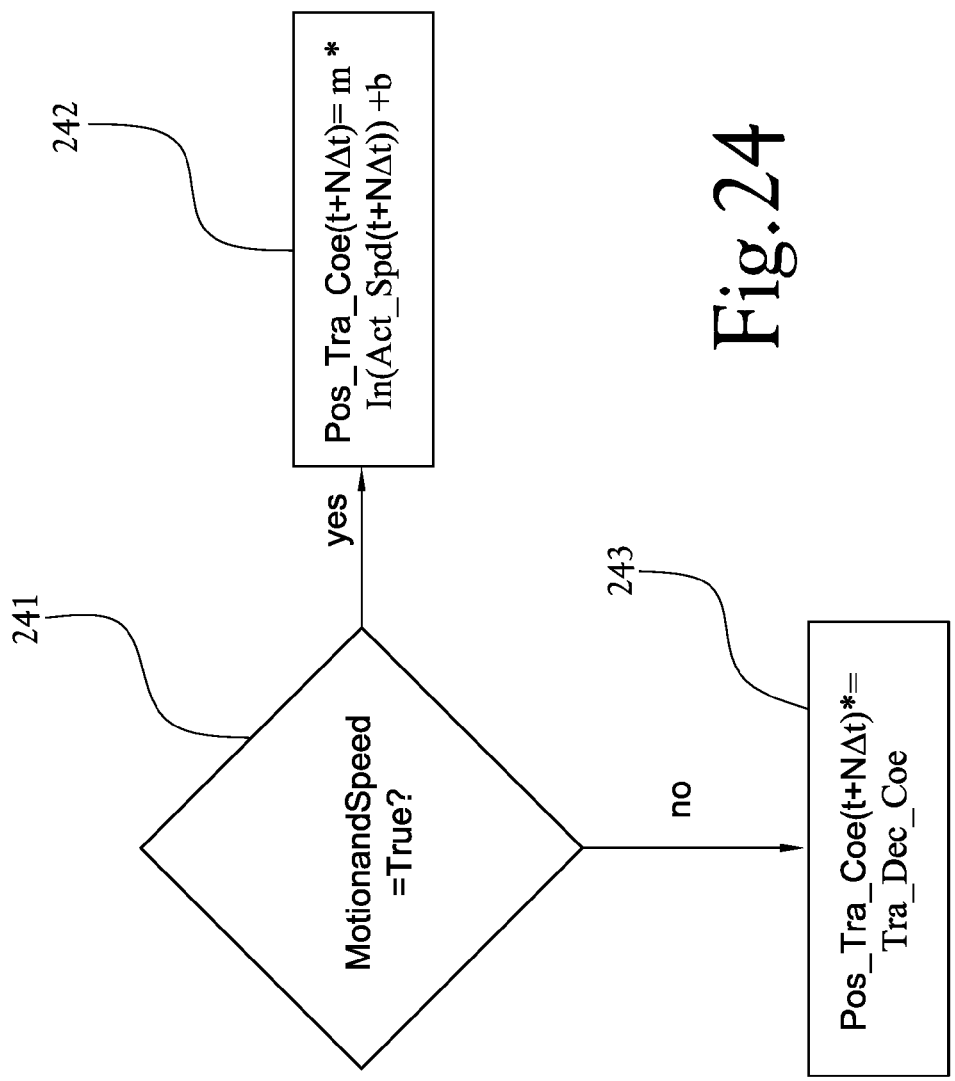
FIG. 24 is a flow chart illustrating the computation of a new position track coefficient based on the actionable speed according to an embodiment of the present general inventive concept.

FIG. 24 is a flow chart illustrating the computation of a new position track coefficient based on the actionable speed according to an embodiment of the present general inventive concept. In operation 241, it is determined whether the MotionandSpeed value is set to true. In other words, it is determined whether both motion and speed are present for the mobile device. If the MotionandSpeed value is true, a new position track coefficient Pos_Tra_Coe(t+NΔt) is set to be equal to m multiplied by the natural log of the actionable speed Act_Spd(t+NΔt), plus b, in operation 242. The variables m and b are set according to the attributes of the subject. In this embodiment of the present general inventive concept the position track coefficient Pos_Tra_Coe(t+NΔt) is linear to the natural log of the actionable speed Act_Spd (t+NΔt). If the MotionandSpeed value is not true, then the position track coefficient is allowed to decay in operation 243, in which the position track coefficient is multiplied by a track coefficient decay value.

Example embodiments of the present general inventive concept can also be achieved by providing an apparatus to track a mobile subject based on Global Navigation Satellite Systems (GNSS) data, including a motion detector to detect motion of the mobile subject independently of the GNSS data and an actionable position and speed determination unit to receive the GNSS data and determine an actionable position and an actionable speed of the mobile subject.

Example embodiments of the present general inventive concept can also be achieved by systems and methods and computer readable mediums wherein a current actionable position can be a sum of a prior actionable position and a product of a degraded position difference and a position tracking coefficient, the degraded position difference being a product of a position degrade coefficient and a difference between a current GNSS position and the prior actionable position, the position degrade coefficient being a function of most recent and prior GNSS position solution metrics and GNSS signal metrics, and the position tracking coefficient can be a function of the actionable speed and a detected motion from the motion detector, and a current actionable speed can be a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of most recent and prior GNSS speed solution metrics, and the speed degrade coefficient can be a function of the GNSS signal metrics.

A boundary test unit can be provided to evaluate a boundary violation according to the current actionable position and current actionable speed of the mobile subject relative to a predetermined boundary.

Example embodiments of the present general inventive concept can also be achieved by providing a method of tracking a mobile subject based on Global Navigation Satellite Systems (GNSS) data, including detecting motion of the mobile subject independently of the GNSS data with a motion detector and receiving the GNSS data and determining an actionable position and an actionable speed of the mobile subject. In additional embodiments, a current actionable position can be a sum of a prior actionable position and a product of a degraded position difference and a position tracking coefficient, the degraded position difference being a product of a position degrade coefficient and a difference between a current GNSS position and the prior actionable position, the position degrade coefficient being a function of most recent and prior GNSS position solution metrics and GNSS signal metrics, and the position tracking coefficient can be a function of the actionable speed and a detected motion from the motion detector.

A current actionable speed can be a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of most recent and prior GNSS speed solution metrics, and the speed degrade coefficient being a function of the GNSS signal metrics. It is possible to evaluate a boundary violation according to the current actionable position and current actionable speed of the mobile subject relative to a predetermined boundary.

The position degrade coefficient can be lower bounded by determining whether or not the prior actionable position and speed resulted in a boundary violation.

In some embodiments the speed degrade coefficient can be lower bounded by whether or not the prior actionable position and speed resulted in a boundary violation. The current actionable speed can be a further a function of GNSS solution metrics and/or whether or not the prior actionable position and speed resulted in a boundary violation.

Figure 25:
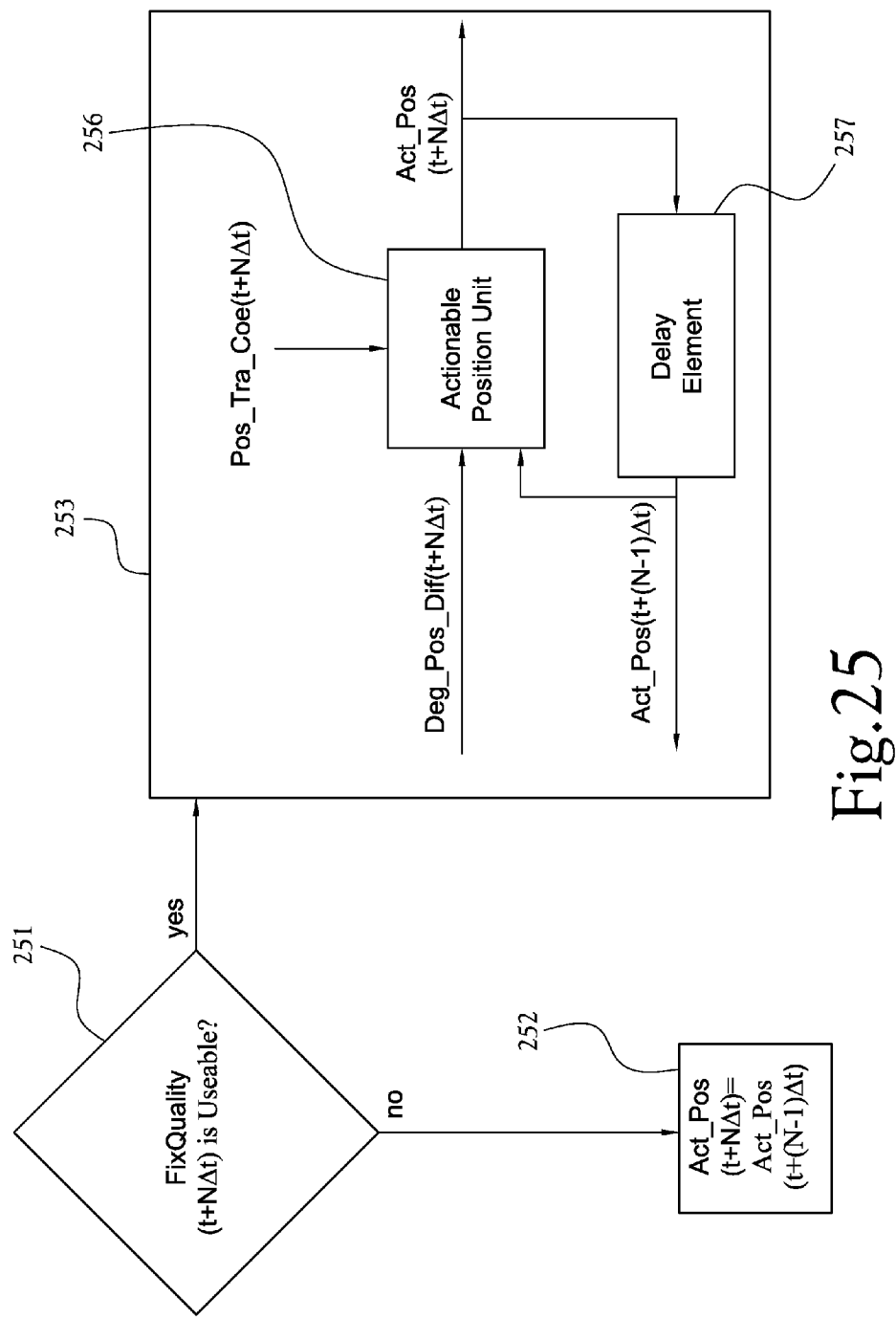
FIG. 25 is a flow chart illustrating the computation of a new actionable position based on a fix quality being useable according to an embodiment of the present general inventive concept.

FIG. 25 is a flow chart illustrating the computation of a new actionable position based on a fix quality being useable according to an embodiment of the present general inventive concept. In operation 251, it is determined whether the fix quality has been set to useable. If it is determined that the fix quality has not been set to useable, then the actionable position Act_Pos(t+NΔt) is set to be equal to the delayed actionable position Act_Pos(t+(N−1)Δt) in operation 252. If it is determined that the fix quality has been set to useable, then the actionable position is newly set in operation 253. In operation 253, the position track coefficient Pos_Tra_Coe (t+NΔt), a degradation position difference Deg_Pos_Dif(t+ NΔt), and the delayed actionable position Act_Pos(t+(N−1) Δt) are input to an actionable position unit 256 to generate the actionable position Act_Pos(t+NΔt), which is fed back into a delay element 257 to generate the delayed actionable position Act_Pos(t+(N−1)Δt).

Figure 26:
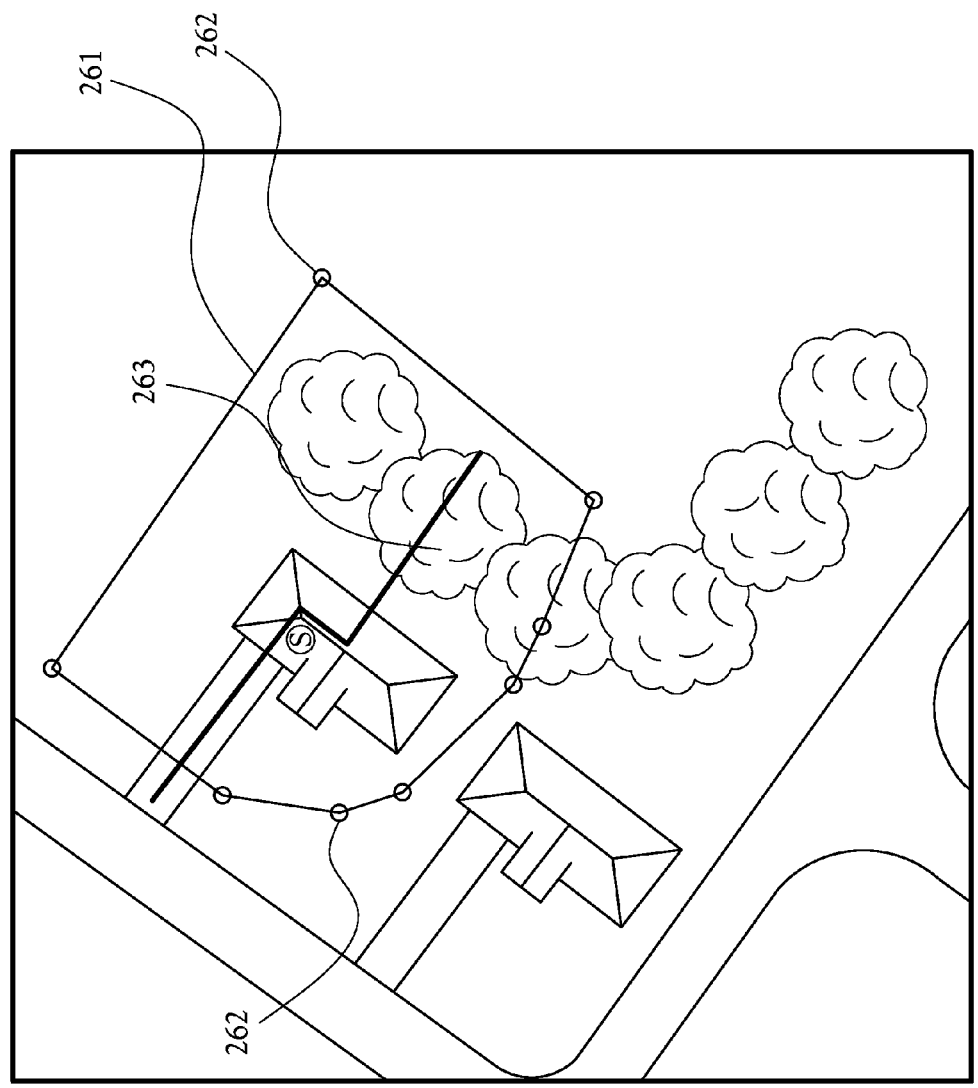
FIG. 26 illustrates a true path taken by a mobile device through a confinement area used in a GNSS fencing application.
Figure 27:
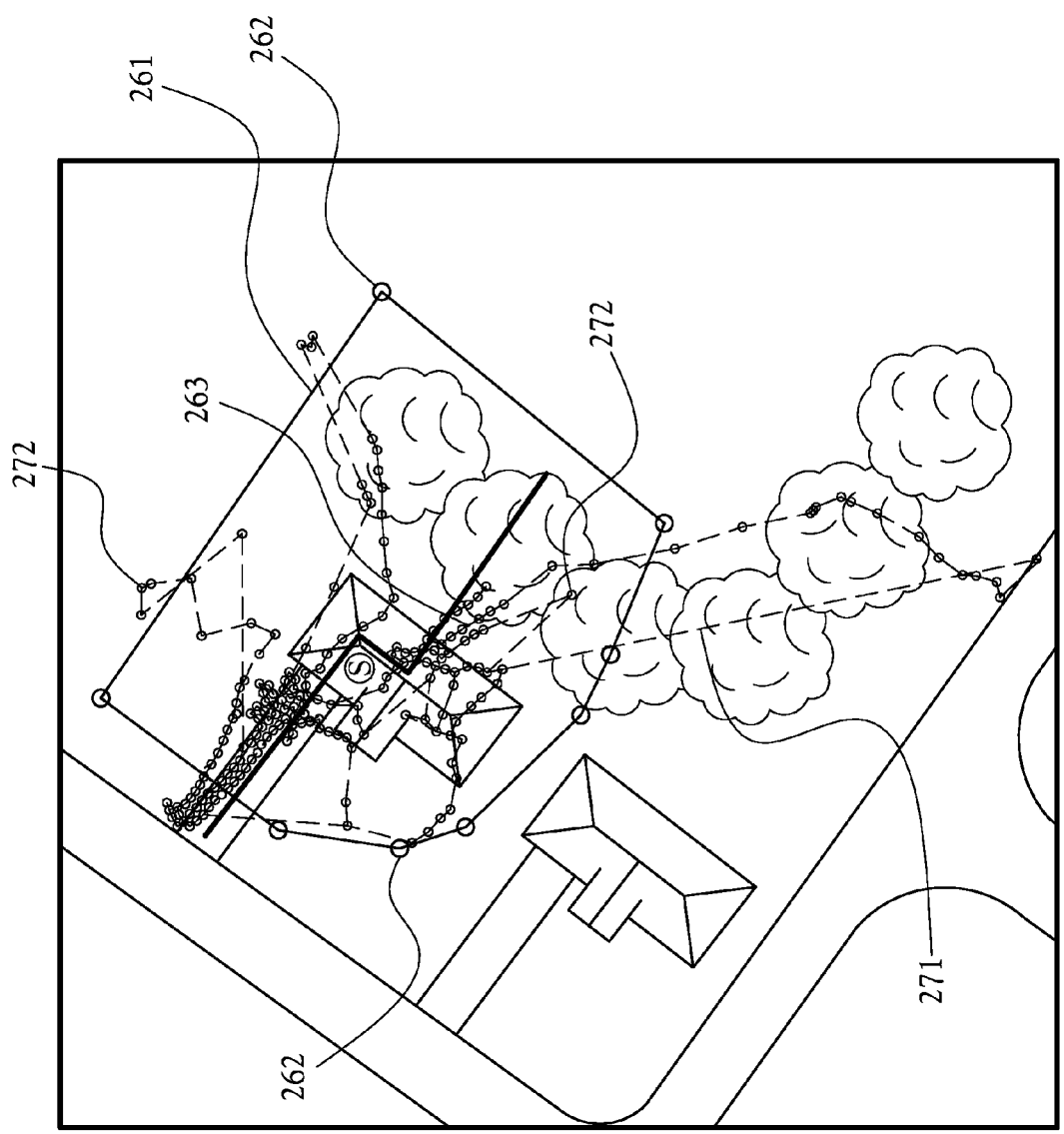
FIG. 27 illustrates the GNSS positions captured by the movement of the mobile device along the true path illustrated in FIG. 26.
Figure 28:
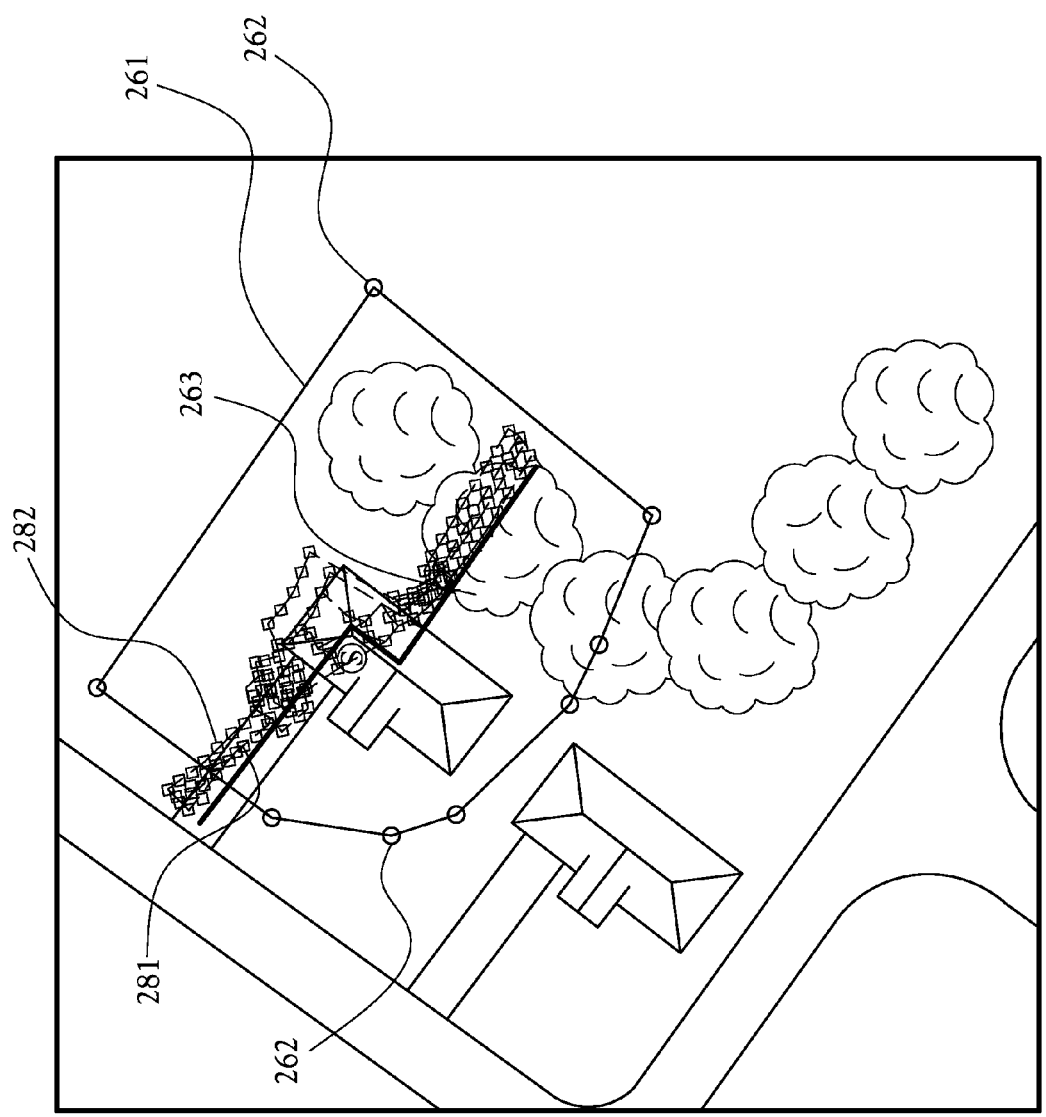
FIG. 28 illustrates the actionable positions captured by the movement of the mobile device along the true path illustrated in FIG. 26.

FIGS. 26-28 illustrate the results of an actual tracking and boundary violation test using one embodiment of the present general inventive concept compared to using only GNSS signals.

FIG. 26 illustrates an actual known path taken by a mobile device through a confinement area used in a GNSS fencing application. The fence is represented by a solid line 261 connecting variously spaced vertices 262 surrounding the illustrated home. A mobile device configured according to an embodiment of the present application was moved back and forth along the illustrated thick solid line 263 while recording both the GNSS and actionable positions, at the same time and under identical conditions. The test spanned approximately five minutes, recording over 400 of both the GNSS and actionable positions. The circled S indicates the safe start location. During the test, the mobile device stopped and re-started navigation numerous times.

FIG. 27 illustrates the GNSS positions captured by the movement of the mobile device along the path illustrated in FIG. 26. The GNSS positions are illustrated as small circles 272, consecutive ones of which are joined by a thin dashed line 271. For the sake of clarity, not all of the more than 400 captured positions are distinguishable, as many may be located on top of one another, but the general direction of the captured positions has been maintained. As indicated in FIG. 27, the GNSS position error increases dramatically when the mobile device is inside the house. The boundary violations at the end of the driveway are real, but the boundary violations to the right and bottom of the fenced area are false.

FIG. 28 illustrates the actionable positions captured by the movement of the mobile device along the path illustrated in FIG. 26. The actionable positions, which were recorded simultaneous to the GNSS positions illustrated in FIG. 27, are illustrated as small squares 282, consecutive ones of which are joined by a thin dashed line 281. For the sake of clarity, not all of the more than 400 captured positions are distinguishable, as many may be located on top of one another, but the general direction of the captured positions has been maintained. As indicated in FIG. 28, the path of the actionable positions shows minimal errors from the true path taken by the mobile device, and no false boundary violations have occurred.

According to various embodiments of the present general inventive concept, a mobile device used to track a mobile subject in order to contain the mobile subject in a bounded containment area may determine an actionable position and speed of the mobile subject which are more reliable than the conventionally derived GNSS position and speed. The actionable position and speed are quantities derived from the GNSS position and speed, confirmation of movement from an independent motion detector, and one or more additional values which may include GNSS signal metrics, GNSS solution metrics, prior actionable position and speed, or any combination thereof. The actionable position and speed may track the GNSS position and speed more closely under favorable signal conditions and with a confirmed modest speed. As GNSS signal conditions degrade or GNSS speed decreases, the actionable position and speed may track the GNSS position and speed less closely. If GNSS signal conditions or GNSS speed are below minimum acceptable levels, the actionable position and speed may cease tracking the GNSS position and speed altogether. Various embodiments of the present general inventive concept also conserve energy due to the employment of an independent motion detector which may indicate when the actionable position and speed need to be determined.

According to various example embodiments of the present general inventive concept, an apparatus to track a mobile subject based on Global Navigation Satellite Systems (GNSS) data may include an actionable position and speed determination unit configured to receive GNSS data and determine an actionable position and an actionable speed of the mobile subject, wherein a current actionable position is determined by processing current GNSS position data according to one or more limiting estimate parameters based on one or more previous actionable positions, and a current actionable speed is determined by processing current GNSS speed data according to one or more limiting estimate parameters indicated by one or more previous actionable speeds. The apparatus may further include a boundary test unit to evaluate a boundary violation according to the current actionable position and current actionable speed of the mobile subject relative to a predetermined boundary.

The concepts and techniques disclosed herein are not limited to any particular type of mobile object, and could be applied to various other applications and objects, without departing from the scope and spirit of the present general inventive concept. For example, although the description discusses a dog collar worn by a dog, the present general inventive concept is not limited to any particular type of animal, and further may be used by a human or mechanical mobile subject.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

The present general inventive concept can be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. An apparatus to track a mobile subject based on Global Navigation Satellite Systems (GNSS) data, comprising:
    a motion detector to detect motion of the mobile subject independently of the GNSS data;
    a boundary determining unit to define a predetermined boundary area relative to the mobile subject;
    an actionable position and speed determination unit configured to receive the GNSS data and determine a current actionable position and a current actionable speed of the mobile subject,
        wherein the actionable position and speed determination unit is configured to calculate the current actionable position according to a sum of a prior actionable position and a product of a degraded position difference and a position tracking coefficient, the degraded position difference being a product of a position degrade coefficient and a difference between a current GNSS position and the prior actionable position, the position degrade coefficient being a function of current GNSS position solution metrics, current GNSS signal metrics, prior GNSS position solution metrics, and prior GNSS signal metrics, and the position tracking coefficient being a function of the actionable speed and a detected motion from the motion detector, and
        wherein the actionable position and speed determination unit is configured to calculate the current actionable speed of the mobile subject according to a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of current GNSS speed solution metrics, current GNSS signal metrics, prior GNSS speed solution metrics and prior GNSS signal metrics; and
    a boundary test unit configured to evaluate a boundary violation according to the current actionable position and current actionable speed of the mobile subject relative to the predetermined boundary.

2. The apparatus of claim 1, wherein the position degrade coefficient is lower bounded by whether or not the prior actionable position and speed resulted in a boundary violation.

3. The apparatus of claim 1, wherein the speed degrade coefficient is lower bounded by whether or not the prior actionable position and speed resulted in a boundary violation.

4. The apparatus of claim 1, wherein the current actionable speed is further a function of GNSS solution metrics.

5. The apparatus of claim 1, wherein the current actionable speed is further a function of whether or not the prior actionable position and speed resulted in a boundary violation.

6. The apparatus of claim 1, wherein the GNSS solution metrics include an horizontal dilution of precision, estimated horizontal position error, estimated speed error, the horizontal dilution of precision times the estimated horizontal position error, the horizontal dilution of precision times the estimated speed error, or any combination thereof.

7. The apparatus of claim 1, wherein the GNSS signal metrics include a quantity representative of the aggregate observable GNSS signal to noise ratio and/or a quantity representative of the aggregate eligible GNSS signal to noise ratio, observable indicating all GNSS signals used to determine the GNSS position and speed, and eligible indicating all decodable GNSS signals emanating from satellites above a predetermined elevation threshold.

8. The apparatus of claim 1, wherein said motion detector is a micro electro-mechanical systems (MEMS) device.

9. The apparatus of claim 1, wherein said motion detector is an omnidirectional vibration sensor.

10. The apparatus of claim 1, wherein a predetermined location within a containment area is used as an initial start location of the mobile subject.

11. The apparatus of claim 1, wherein the prior actionable position and speed are maintained in response to the motion detector detecting no motion of the mobile subject.

12. The apparatus of claim 1, wherein the GNSS data includes GNSS PVT (position, velocity, time) signals, pseudo-range error data, time assist data, ephemeris assist data, or any combination thereof.

13. The apparatus of claim 1, wherein the mobile subject is a human or animal.

14. The apparatus of claim 1, wherein the apparatus is attached to or worn by the mobile subject.

15. A method of tracking a mobile subject based on Global Navigation Satellite Systems (GNSS) data, the method comprising:
    detecting motion of the mobile subject independently of the GNSS data with a motion detector;
    defining a predetermined boundary area relative to the mobile subject with a boundary determining unit;
    receiving the GNSS data at an actionable position and speed determination unit, and determining an actionable position and an actionable speed of the mobile subject,
    wherein the actionable position and speed determination unit is configured to calculate the current actionable position according to a sum of a prior actionable position and a product of a degraded position difference and a position tracking coefficient, the degraded position difference being a product of a position degrade coefficient and a difference between a current GNSS position and the prior actionable position, the position degrade coefficient being a function of current GNSS position solution metrics, current GNSS signal metrics, prior GNSS position solution metrics, and prior GNSS signal metrics, and the position tracking coefficient being a function of the actionable speed and a detected motion from the motion detector, and
    wherein the current actionable position and speed determination unit is configured to calculate the current actionable speed of the mobile subject according to a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of current GNSS speed solution metrics, current GNSS signal metrics, prior GNSS speed solution metrics, and prior GNSS signal metrics; and
    evaluating a boundary violation according to the current actionable position and current actionable speed of the mobile subject relative to the predetermined boundary.

16. The method of claim 15, wherein the GNSS solution metrics include an horizontal dilution of precision, estimated horizontal position error, estimated speed error, the horizontal dilution of precision times the estimated horizontal position error, the horizontal dilution of precision times the estimated speed error, or any combination thereof.

17. The method of claim 15, wherein the GNSS signal metrics include a quantity representative of the aggregate observable GNSS signal to noise ratio and/or a quantity representative of the aggregate eligible GNSS signal to noise ratio, observable indicating all GNSS signals used to determine the GNSS position and speed, and eligible indicating all decodable GNSS signals emanating from satellites above a predetermined elevation threshold.

18. The method of claim 15, wherein a predetermined location within a containment area is used as an initial start location of the mobile subject.

19. The method of claim 15, wherein the prior actionable position and speed are maintained in response to detecting no motion of the mobile subject.

20. The method of claim 15, wherein the GNSS data includes GNSS PVT (position, velocity, time) signals, pseudo-range error data, time assist data, ephemeris assist data, or any combination thereof.

21. The method of claim 15, wherein the mobile subject is a human or animal.

22. A non-transitory computer readable storage medium having recorded thereon a program to cause a computer to perform a method of tracking a mobile subject to detect a boundary violation based on Global Navigation Satellite Systems (GNSS) data, the method comprising:

detecting motion of the mobile subject independently of the GNSS data with a motion detector;

defining a predetermined boundary area relative to the mobile subject with a boundary determining unit;

receiving the GNSS data at an actionable position and speed determination unit, and determining an actionable position and an actionable speed of the mobile subject, wherein the actionable position and speed determination unit is configured to calculate the current actionable position according to a sum of a prior actionable position and a product of a degraded position difference and a position tracking coefficient, the degraded position difference being a product of a position degrade coefficient and a difference between a current GNSS position and the prior actionable position, the position degrade coefficient being a function of current GNSS position solution metrics, current GNSS signal metrics, prior GNSS position solution metrics, and prior GNSS signal metrics, and the position tracking coefficient being a function of the actionable speed and a detected motion from the motion detector, and wherein the actionable position and speed determination unit is configured to calculate the current actionable speed of the mobile subject according to a function of a prior actionable speed and a degraded speed estimate, the degraded speed estimate being a product of a speed estimate and a speed degrade coefficient, the speed estimate being a function of the prior speed estimate and a GNSS speed estimate, the speed degrade coefficient being a function of current GNSS speed solution metrics, current GNSS signal metrics, prior GNSS speed solution metrics, and prior GNSS signal metrics; and evaluating a boundary violation according to the current actionable position and current actionable speed of the mobile subject relative to the predetermined boundary.

23. An apparatus to track a mobile subject based on Global Navigation Satellite Systems (GNSS) data, comprising:

an actionable position and speed determination unit configured to receive GNSS data and determine a current actionable position and a current actionable speed of the mobile subject, wherein the actionable position and speed determination unit is configured to calculate the current actionable position by processing current GNSS position data according to one or more estimate parameters derived from one or more previous actionable positions previously calculated by the actionable position and speed determination unit, and wherein the actionable position and speed determination unit is configured to calculate the current actionable speed by processing current GNSS speed data according to one or more estimate parameters derived from one or more previous actionable speeds previously calculated by the actionable position and speed determination unit.

24. The apparatus of claim 23, further comprising a boundary test unit to evaluate a boundary violation according to the current actionable position and current actionable speed of the mobile subject relative to a predetermined boundary.

* * * * *